(12) United States Patent
Hashimura et al.

(10) Patent No.: US 7,924,683 B2
(45) Date of Patent: Apr. 12, 2011

(54) OPTICAL PICKUP APPARATUS WITH OBJECTIVE OPTICAL SYSTEM AND GUIDING OPTICAL SYSTEM

(75) Inventors: Junji Hashimura, Sagamihara (JP); Tohru Kimura, Hachioji (JP); Mitsuru Mimori, Kokubunji (JP)

(73) Assignee: Konica Minolta Opto, Inc., Tokyo (JP)

( * ) Notice: Subject to any disclaimer, the term of this patent is extended or adjusted under 35 U.S.C. 154(b) by 700 days.

(21) Appl. No.: 11/092,791

(22) Filed: Mar. 30, 2005

(65) Prior Publication Data

US 2005/0219987 A1 Oct. 6, 2005

(30) Foreign Application Priority Data

Apr. 2, 2004 (JP) ................................. 2004-109867

(51) Int. Cl.
*G11B 7/135* (2006.01)
(52) U.S. Cl. ................................. 369/112.08; 369/44.32
(58) Field of Classification Search .................. 359/637; 369/44.23, 112.01, 112.03
See application file for complete search history.

(56) References Cited

U.S. PATENT DOCUMENTS

| | | | |
|---|---|---|---|
| 6,195,315 B1 * | 2/2001 | Takahashi et al. | 369/44.23 |
| 6,298,028 B1 * | 10/2001 | Arikawa et al. | 369/112.22 |
| 6,781,928 B2 * | 8/2004 | Iwata et al. | 369/44.23 |
| 7,161,890 B2 * | 1/2007 | Komma et al. | 369/112.07 |
| 7,260,047 B2 * | 8/2007 | Nishioka et al. | 369/112.05 |
| 7,301,882 B2 * | 11/2007 | Itonaga | 369/112.23 |
| 2002/0191526 A1 * | 12/2002 | Saito | 369/112.26 |
| 2003/0185134 A1 * | 10/2003 | Kimura et al. | 369/112.08 |
| 2004/0032815 A1 * | 2/2004 | Kim et al. | 369/112.26 |
| 2004/0095875 A1 * | 5/2004 | Arai et al. | 369/121 |
| 2004/0109242 A1 * | 6/2004 | Komma et al. | 359/738 |
| 2004/0223442 A1 * | 11/2004 | Koike et al. | 369/112.08 |
| 2005/0068881 A1 * | 3/2005 | Kimura et al. | 369/112.23 |
| 2005/0152258 A1 * | 7/2005 | Komma et al. | 369/112.05 |
| 2005/0201248 A1 * | 9/2005 | Kitabayashi et al. | 369/112.01 |

FOREIGN PATENT DOCUMENTS

| | | |
|---|---|---|
| EP | 1304689 | 4/2003 |
| JP | 11-259893 | 9/1999 |
| JP | 2004-079146 | 3/2004 |

(Continued)

OTHER PUBLICATIONS

Japanese Patent Appln No. 2004-109867, Examiner's Decision of Refusal, drafted Feb. 1, 2010, 2 pages.

(Continued)

*Primary Examiner* — Hoa T Nguyen
*Assistant Examiner* — Mark L Fischer
(74) *Attorney, Agent, or Firm* — Finnegan, Henderson, Farabow, Garrett & Dunner, L.L.P.

(57) ABSTRACT

An optical pickup apparatus comprises a first light source for emitting a first light flux having first wavelength $\lambda 1$ (430 nm>$\lambda 1$>380 nm), a second light source for emitting a second light flux having second wavelength $\lambda 2$ ($\lambda 2$>$\lambda 1$), an objective optical system having phase structure thereon, and at least one moving optical element for guiding the light flux into the objective optical system, the moving optical element being moved in a direction parallel to an optical axis corresponding to the first light wavelength $\lambda 1$ and the second light wavelength $\lambda 2$, wherein the objective optical system has phase structure and satisfies $M1=M2=0$, where, M1 and M2 denote a first and second magnifications of the objective optical system for recording and/or reproducing the information on or from the first and second optical information media.

7 Claims, 10 Drawing Sheets

FOREIGN PATENT DOCUMENTS

| | | |
|---|---|---|
| JP | 2004-164817 | 6/2004 |
| JP | 2004-185781 | 7/2004 |
| JP | 2005-222601 | 8/2005 |
| WO | WO 03075267 A1 * | 9/2003 |

OTHER PUBLICATIONS

Japanese Patent Appln No. 2004-109867, Notice of Reasons for Refusal, drafted Mar. 13, 2009, 3 pages.

* cited by examiner

OPTICAL AXIS

OPTICAL AXIS

OPTICAL AXIS

OPTICAL AXIS

OPTICAL AXIS

OPTICAL AXIS

OPTICAL PICKUP APPARATUS WITH OBJECTIVE OPTICAL SYSTEM AND GUIDING OPTICAL SYSTEM

This application claims priority from Japanese Patent Application No. 2004-109867 filed on Apr. 2, 2004, which is incorporated hereinto by reference.

TECHNICAL FIELD

The present invention relates to an optical pickup apparatus capable of recording and/or reproducing information using different types of optical information recording media in an interchangeable manner.

BACKGROUND OF THE INVENTION

In the field of an optical pickup apparatus in recent years, there has been an increasing tendency toward the use of short wavelength for the laser light source used as a light source for reproduction of the information recorded on an optical disc and for recording of information on the optical disc. For example, there have been efforts made for commercial use of a laser light source having a wavelength of 400 through 420 nm such as in a blue-violet semiconductor laser and blue-violet SHG laser for converting the wavelength of an infrared semiconductor laser using the second harmonic wave. When employing an objective lens having the same numerical aperture (NA) as that of the DVD (Digital Versatile Disc), use of such a blue-violet laser light source allows recording of 15 through 20 GB information on an optical disc having a diameter of 12 cm. When the NA of the objective lens is increased to 0.85, it permits recording of 23 through 25 GB information on the optical disc having a diameter of 12 cm. In the following description of this specification, an optical disc using a blue-violet laser light source and a photomagnetic disc will be collectively called the high-density optical disc.

In the high-density optical disc employing an objective lens having the NA of 0.85, there is an increase in the comatic aberration caused by the skew of an optical disc. Accordingly, in some cases, the protective layer is designed to be thinner than that of a DVD (0.1 mm as compared to 0.6 mm for the DVD), thereby reducing the comatic aberration resulting from the skew. Incidentally, the value of the optical disc player/recorder as a commercial product cannot be made sufficient merely by the capability of providing appropriate recording/reproduction of information using the high-density optical disc of this type. In view of the fact that a DVD and CD (Compact Disc) carrying a great variety of information are currently placed on the market, the capability of ensuring appropriate recording/reproduction of information using the high-density optical disc is not sufficient. For example, appropriate recording/reproduction with the DVD and CD owned by a user will enhance the commercial value of an optical disc player/recorder for high-density optical disc. Thus, the optical pickup apparatus mounted on the optical disc player/recorder for high-density optical disc is required to provide the function of appropriate recording/reproduction of information using any one of the high-density optical disc, DVD and CD in an interchangeable manner.

One of the methods for ensuring appropriate recording/reproduction of information using any one of the high-density optical disc, DVD and CD in an interchangeable manner is selective switching among the optical systems for high-density optical disc, DVD and CD, in response to the recording density of the optical disc for recording and reproducing information. However, this method requires use of a plurality of optical systems, and is not suited for product downsizing and cost cutdown.

Thus, in order to simplify the arrangement of an optical pickup apparatus characterized by medium interchangeability and to reduce the cost, it is preferred to promote compatibility between the optical system for high-density optical disc and those for the DVD and CD, and to minimize the number of optical components constituting the optical pickup apparatus. Promoting compatibility between the objective optical systems arranged opposite to the optical disc brings an advantage in simplifying the optical pickup apparatus and reducing the cost. To get a standardized objective optical system compatible with various types of optical discs having different wavelengths for recording/reproduction, a phase structure characterized by dependency of spherical aberration on wavelength must be incorporated in the objective optical system.

The European Provisional Publication No. 1304689 discloses an objective optical system, having a diffraction structure as a phase structure, compatible with a high-density optical disc and conventional DVD and CD, and an optical pickup apparatus carrying this objective optical system.

However, the objective optical system disclosed in the Patent Document 1 has a big difference in magnification for recording/reproduction of information using each optical disc. In the optical pickup apparatus, this makes it difficult to standardize the optical components other than the objective optical system or to use the light source module where multiple types of light sources are integrated. For this reason, simplification of the configuration of the optical pickup apparatus or cost reduction cannot be achieved. This has created a problem in prior art. Another problem in the prior art is found in the increased comatic aberration at the time of lens tracking, due to a large magnification for recording/reproduction of information with the CD in particular.

SUMMARY OF THE INVENTION

In view of the prior art described above, it is an object of the present invention to provide an optical pickup apparatus carrying an objective optical system. This objective optical system has a phase structure and provides adequate recording and/or reproduction of information using three types of discs having different recording densities including a high-density optical disc based on a blue-violet laser light source, DVD and CD. This optical pickup apparatus is further characterized by simplified construction and low production cost.

In the following description of this Specification, the optical disc using a blue-violet semiconductor laser and blue-violet SHG laser as a light source for recording/reproduction of information will be collectively called the high-density optical disc. In addition to the optical disc, having a protective layer of about 0.1 mm in thickness, for recording/reproduction of information using an objective optical system having the NA of 0.85 (e.g. BD: Blu-Ray Disc), the high-density optical disc includes:

an optical disc, having a protective layer of about 0.6 mm in thickness, for recording/reproduction of information using an objective optical system having the NA of 0.65 through 0.67 (e.g. HD and DVD);

an optical disc equipped with a protective layer having a thickness of several nanometers through several tens of nanometers on the information recording surface; and an optical disc equipped with a protective layer or film without any thickness.

In the present Specification, the high-density optical disc further includes a photomagnetic disc using a blue-violet semiconductor laser or blue-violet SHG laser as a light source for recording/reproduction of information.

In the present Specification, the DVD is a generic term covering the DVD-based optical disc such as a DVD-ROM, DVD-Video, DVD-Audio, DVD-RAM, DVD-R, DVD-RW, DVD+R and DVD+RW. The CD is a generic term covering the CD-based optical disc such as a CD-ROM, CD-Audio, CD-Video, CD-R and CD-RW. The high-density optical disc has the highest recording density, followed by the DVD and CD in that order.

In accordance with one aspect of the present invention, an optical pickup apparatus comprises a first light source for emitting a first light flux having first wavelength $\lambda 1$ (430 nm>$\lambda 1$>380 nm), a second light source for emitting a second light flux having second wavelength $\lambda 2$ ($\lambda 2$>$\lambda 1$), an objective optical system having phase structure thereon, and at least one moving optical element for guiding the light flux into the objective optical system, the moving optical element being moved in a direction parallel to an optical axis corresponding to the first light wave $\lambda 1$ and the second light wave $\lambda 2$, wherein the objective optical system has phase structure and satisfies M1=M2=0, where, M1 and M2 denote a first and second magnifications of the objective optical system for recording and/or reproducing the information on or from the first and second optical information media.

The specific embodiment of the present invention refers to an optical pickup apparatus comprises a first light source for emitting the first light flux of the first wavelength $\lambda 1$, a second light source for emitting the second light flux of the second wavelength $\lambda 2$ ($\lambda 2$>$\lambda 1$), a third light source for emitting the third light flux of third wavelength $\lambda 3$ ($\lambda 3$>$\lambda 2$), an objective optical system wherein the first light flux is condensed on the information recording surface of the first information recording medium of the recording density $\rho 1$; the second light flux is condensed on the information recording surface of the second information recording medium of the recording density $\rho 2$ ($\rho 2$<$\rho 1$); and the third light flux is condensed on the information recording surface of the third information recording medium of the recording density $\rho 3$ ($\rho 3$<$\rho 2$). This optical pickup apparatus performs recording and/or reproduction of the information by converging the light flux from the light source on the information recording surface of the information recording medium through the objective optical system.

This objective optical system has a phase structure and satisfies M1=M2=M3=0 when:

M1 is the first magnification of the objective optical system for recording and/or reproduction of information using the first optical information medium;

M2 is the second magnification of the objective optical system for recording and/or reproduction of information using the second optical information medium is; and M3 is the third magnification of the objective optical system for recording and/or reproduction of information using the third optical information medium.

At the same time, this optical pickup apparatus has at least one collimating lens for guiding the light flux from each of the aforementioned light sources into the objective optical system as a parallel light flux or approximately parallel light flux. This optical pickup apparatus is further characterized in that the collimating lens can be shifted in the direction parallel to the optical axis.

In the present invention, the first magnification M1 through the third magnification M3 of objective optical systems relative to the first through third light fluxes are assumed to have the relationship of M1=M2=M3=0 (wherein "magnification=0" includes entry of the approximately parallel beams, although it indicates entry of the parallel beams in the strict sense of the word). This protects the system against possible degradation of aberration, despite a lens shift that may result from tracking.

In this case, assume that the light flux entering the objective optical system through the collimating lens common to the light flux from each light source is parallel or substantially parallel. (Here "approximately parallel" refers to the state wherein the angle formed by the optical axis and the marginal beam of the light flux is within ±1 degree). Then there is a difference in the wavelengths of the light source for recording and/or reproduction of information for each of optical discs. Accordingly, a preferred distance from the collimating lens to the light source is different for each of the first through third light sources, depending on the chromatic aberration of the collimating lens. This makes it difficult to integrate two light sources thereof into one, or all three light sources into one. Another problem is that, if the two or three light sources are integrated into one, a trouble occurs to the aberration of the objective optical system resulting from the chromatic aberration of the collimating lens. This construction, if not improved, will raise a further problem.

Thus, if the collimating lens can be shifted as in the present invention, the distance from the collimating lens to the light source can be freely changed. In this case, even if two of the three light sources having different wavelengths or all the three light sources are integrated into one, the collimating lens to a predetermined position is moved. This allows the first magnification M1 through third magnification M3 of the objective optical systems to have the relationship of M1=M2=M3=0, with respect to the first through third light fluxes. Further, the construction of the optical pickup apparatus can be simplified by standardizing the collimating lens or integrating the light sources into one, and downsizing of the apparatus and cost cutting can be promoted.

The phase structure formed on the optical surface of the aforementioned objective optical system can be modified into the one for correcting the chromatic caused by the first wavelength $\lambda 1$ and second wavelength $\lambda 2$ and/or the spherical aberration caused by the difference in the thickness of the protective layer of the first optical information medium and the protective layer of the second optical information medium, for example. The chromatic aberration in the sense in which it is used here refers to the difference in the position of paraxial image point resulting from the wavelength difference and/or the spherical aberration resulting from the wavelength difference.

The aforementioned phase structure can be either a diffraction structure or an optical path difference assigning structure. In some case, the structure is composed of a plurality of diffraction straps 100 where the cross sectional form including the optical axis is arranged in a serrated configuration, as schematically shown in FIG. 1. In another case, the structure is composed of a plurality of diffraction straps 102 where the direction of level difference 101 is the same in the effective diameter where the cross sectional form including the optical axis is arranged in a stepped configuration, as schematically shown in FIG. 2. In another case, the structure is composed of a plurality of diffraction straps 103 where a stepped configuration is formed inside, as schematically shown in FIG. 3. In a further case, the structure is composed of a plurality of diffraction straps 105 where the direction of level difference 104 is changed at some midpoint of the valid diameter and the cross sectional form including the optical axis is arranged in a stepped configuration, as schematically shown in FIG. 4. Thus, the structure schematically shown in FIG. 4 can be a diffraction structure or optical path difference assigning structure, depending on the case. FIGS. 1 through 4 schematically show the phase structures formed on a flat plane. However, each phase structure may be formed on a spherical surface or on an aspherical surface.

In the present Specification, "objective optical system" is defined as an optical system, arranged opposite to the optical disc in an optical pickup apparatus, containing at least one light converging device capable of converging the light fluxes having different wavelengths emitted from a light source onto each of the information recording surfaces having different recording densities. The objective optical system can be composed of a light converging device alone. In this case, the phase structure is formed on the optical surface of the light converging device.

If there are optical devices, integrated with the aforementioned light converging device, for tracking and focusing using an actuator, then the optical system composed of these optical devices and light converging device serves as an objective optical system. When the objective optical system is composed of a plurality of optical devices, the phase structure can be formed on the optical system of the light converging device. However, to reduce the adverse effect of vignetting of light flux by the level difference of the phase structure, the phase structure is preferably formed on the optical surface of the optical device other than the light converging device.

The aforementioned light converging device can be a plastic lens or a glass lens. When a plastic lens is used, a cyclic olefin based plastic material is preferably used. Further, the cyclic olefin based plastic material to be used is preferred to be the one where the refraction index $N_{405}$ at a temperature of 25° C. with respect to the wavelength of 405 nm is within the range from 1.54 through 1.60, and the rate of change of the refraction index $dN_{405}/dT$ (° C.$^{-1}$) at a temperature of −5 through 70° C. with respect to the wavelength of 405 nm is within the range from $-10\times10^{-5}$ through $-8\times10^{-5}$.

When a glass lens is used as a light converging device, formation can be performed at a comparatively low temperature if the glass transition point Tg does not exceed 400° C. This will prolong the service life of the die. The material having a low glass transition point Tg includes the K-PG325 and K-PG375 (trade name) by Sumida Optical Glass Co., Ltd., for example.

Incidentally, a glass lens has a specific gravity greater than the plastic lens in normal cases. If the glass lens is used for the light converging device, the weight will be increased to impose a load on the actuator driving the objective optical system. Accordingly, when the glass lens is used for the light converging device, a glass material having a smaller specific gravity is preferably used. To put it more specifically, the specific gravity is preferably 3.0 or less, more preferably 2.0 or less.

The material of the aforementioned light converging device can be prepared by dispersing grains each having a diameter of 30 nm or less in the plastic material. If the inorganic material where the refraction index is increased by the rising temperature is mixed with the plastic material where the refraction index is reduced by the rising temperature, dependency of the refraction index of them upon temperature can be offset. Keeping the moldability of the plastic material unaffected, this arrangement provides an optical material (hereinafter referred to as "athermal resin") characterized by a smaller change in refraction index with respect to temperature change.

The following describes the temperature change of the refraction index of the light converging device. The rate of change of the refraction index with respect to temperature change is obtained by differentiating the refraction index n with respect to temperature T according to the Lorentz-Lorenz formula. The result is expressed in "A" shown in the following [Eq. 3]:

$$A = \frac{(n^2+2)(n^2-1)}{6n \cdot \left\{(-3\alpha) + \frac{1}{[R]} \cdot \frac{\delta[R]}{\delta T}\right\}} \quad [\text{Eq. 3}]$$

where "n" denotes the refraction index of the light converging device relative to the wavelength of the laser light source, "α" the coefficient of linear expansion of the light converging device, and [R] the refracting power of the light converging device.

In the case of a general plastic material, the contribution of the second term is smaller than that of the first one, and the second term can be almost ignored. For example, in the case of an acryl resin (PMMA), the coefficient of linear expansion α is $7\times10^{-5}$. When this is substituted into the aforementioned equation, we get: $A=-12\times10^{-5}$. This result approximately agrees with the actually measured value. In the athermal resin, the fine grains having a diameter of 30 nm or less are dispersed in the plastic material. This virtually makes a big contribution to the second term of the aforementioned equation so as to offset the change resulting from the linear expansion of the first term. To put it more specifically, the rate of change of the refraction index with respect to the temperature change, which was about $-12\times10^{-5}$ in the prior art, is preferred to be kept below $10\times10^{-5}$ in absolute terms. More preferably, it is kept below $8\times10^{-5}$, and still more preferably, it is maintained below $6\times10^{-5}$ for the purpose of reducing a change in spherical aberration resulting from the change in the temperature of the light converging device.

For example, if fine grains of niobium oxide ($Nb_2O_5$) are dispersed in the acryl resin (PMMA), dependency of the changes of refraction index on temperature changes can be resolved. The volume ratio of the plastic material as a base material is 80 and that of niobium oxide is about 20. If they are mixed uniformly, fine grains tend to coagulate. This problem can be resolved by the known art of dispersion by applying an electric charge to the surface of the grain. This method provides a required state of distribution.

This volume ratio can be adequately adjusted to control the rate of change of the refraction index with respect to temperature change. It is also possible to blend and disperse a plurality of type of inorganic grains on the order of nanometers.

In the aforementioned example, the volume ratio is 80 to 20. It can be adjusted in the range of 90 to 10 through 60 to 40, as appropriate. If the volume ratio is smaller than 90 to 10, the effect of reducing the change in refraction index is reduced. If the volume ratio is greater than 60 to 40, there is a problem with the moldability of the athermal resin.

The fine grain is preferably an inorganic material, more preferably an oxide material. It is also preferred that the oxide have been oxidized to a level of saturation without further oxidation. Being an inorganic material is preferred to reduce the level of reaction with the plastic material as a polymeric organic substance. Being an oxide is preferred to avoid deterioration of transparency or wave front resulting from a long-term application of blue-violet laser. Oxidation will be encouraged particularly under severe condition where blue-violet laser beams are applied at a high temperature. However, if the aforementioned inorganic oxide material is used, it is also possible to avoid deterioration of transparency or wave front resulting from oxidation.

If the fine grain dispersed in the plastic material has a large diameter, the incoming light flux tends to scatter and the transmittance of the light converging device will reduce. In a high-density optical disc, the blue-violet laser used for recording/reproduction of information is not sufficiently high. In this situation, if the transmittance of the light converging device with respect to the light flux of blue-violet laser is low, it will be difficult to achieve a high recording speed and satisfactory compatibility with the multilayer disc. Accordingly, the diameter of the fine grains to be dispersed in the plastic material is preferably 20 nm or less, more preferably 10 through 15 nm. This is advantageous in avoiding reduction of the light converging device in transmittance.

Another specific arrangement of the present invention is that the aforementioned phase structure is based on the diffraction structure. Use of the diffraction structure in the phase structure as in the present invention improves the properties of the objective optical system compatible with three types of optical discs having different recording densities.

In the optical pickup apparatus of the present invention, the aforementioned collimating lens is arranged on the light source side of the objective optical system, and inside the common optical path through which the aforementioned first, second and third light fluxes pass. If the collimating lens is arranged on the light source side of the objective optical system, and inside the common optical path through which the aforementioned first, second and third light fluxes pass, as in the present invention, the optical parts for the aforementioned first, second and third light fluxes can be standardized as one common type. Thus, this arrangement reduces the number of the parts used in the optical pickup apparatus and simplifies the configuration, with the result that the optical pickup apparatus production cost is reduced.

A further specific arrangement of the present invention is that the collimating lens meets the following conditions:

$$0.01 < \delta CL/fCL < 0.05 \quad (1)$$

wherein $\delta CL$ denotes the shift of collimating lens, and fCL indicates the focal distance of the collimating lens relative to the wavelength of the first light source.

If the collimating lens meets the Eq. (1), the objective optical system can be used in such a way that the first magnification M1, second magnification M2 and third magnification M3 will be the same (0) with one another. Assume that the aforementioned value has exceeded the upper and lower limits of the Eq. (1). If the collimating lenses for the first and second light fluxes, for example, are standardized as one common type, the first light flux that passes through the common optical parts and enters the objective optical system has the level of divergence different from that of the second one, under the influence of chromatic aberration. This is not preferred. This is because, if the first and second light fluxes having a different level of divergence from each other enter the objective optical system failing to meet the Eq. (1), spherical aberration may occur to either of the light flux.

Even if the limits of the condition specified in Eq. (1) have been exceeded, the same level of divergence can be provided between the first light flux entering the objective optical system and the second light flux entering the objective optical system, when a chromatic aberration correcting device having the function of correcting the chromatic aberration of the common optical parts is arranged in the common optical path shared between the first and second light fluxes. Such a chromatic aberration correcting device can be a doublet lens composed of positive and negative lenses having wavelength dispersion different from each other, or a diffraction optical device. The aforementioned chromatic aberration correcting device can be a device independent from the aforementioned common optical parts, or can be installed inside them. However, use of such a chromatic aberration correcting device will be accompanied by an increased number of parts, difficult processing, complicated configuration of the apparatus and increased production cost. To ensure simple apparatus structure and reduced production cost, it is preferred not to use the chromatic aberration correcting device.

A still further specific arrangement of the present invention is characterized in that at least two of the first, second and third light sources are formed in one piece. The configuration of the optical pickup apparatus is further simplified by using the light source unit with a plurality of light sources integrated into one piece, as in the present invention. In this case, the light source unit with a plurality of light sources integrated into one piece can be the one including a light emitting section for emitting the first light flux and a light emitting section for emitting the second light flux, these sections formed on an identical substrate, or the one including of a semiconductor chip for emitting the first light flux and semiconductor chip for emitting the second light flux, these chips incorporated in one casing. Further reduction in the number of parts can be achieved by using a light source unit with all light sources from the first through third light sources integrated into one piece. This arrangement allows the apparatus to be downsized, and is preferably used. Further, when the light source unit comprises the light sources wherein two of the first, second and third light sources are integrated in one piece, the apparatus will be preferably simplified and downsized if the remaining one light source is formed integrally with an optical detector for the light flux of the light source.

As a still further specific arrangement of the present invention, an optical pickup apparatus comprises:
a first light source for emitting the first light flux of the first wavelength $\lambda 1$;
a second light source for emitting the second light flux of the second wavelength $\lambda 2$ ($\lambda 2 > \lambda 1$);
a third light source for emitting the third light flux of third wavelength $\lambda 3$ ($\lambda 3 > \lambda 2$);
an objective optical system wherein the first light flux is condensed on the information recording surface of the first information recording medium of the recording density $\rho 1$; the second light flux is condensed on the information recording surface of the second information recording medium of the recording density $\rho 2$ ($\rho 2 < \rho 1$); and the third light flux is condensed on the information recording surface of the third information recording medium of the recording density $\rho 3$ ($\rho 3 < \rho 2$). This optical pickup apparatus performs recording and/or reproduction of the information by converging the light flux from the light source on the information recording surface of the information recording medium through the objective optical system.

This objective optical system has a phase structure and satisfies M1=M2=M3=0 when:
the first magnification of the objective optical system for recording and/or reproduction of information using the first optical information medium is M1;
the second magnification of the objective optical system for recording and/or reproduction of information using the first optical information medium is M2; and the third magnification of the objective optical system for recording and/or reproduction of information using the first optical information medium is M3.

At the same time, this optical pickup apparatus has a collimating lens for launching the light flux from each of the aforementioned light sources into the objective optical system as a parallel light flux or approximately parallel light flux. This optical pickup apparatus is further characterized in that the aberration correcting device comprises at least two lenses and at least one lens can be shifted in the direction parallel to the optical axis.

In the present invention, the first magnification M1 through the third magnification M3 of objective optical systems relative to the first through third light fluxes are assumed to have the relationship of M1=M2=M3=0 (wherein "magnification=0" includes entry of the approximately parallel beams, although it indicates entry of the parallel beams in the strict sense of the word). This protects the systems against possible degradation of aberration, despite a lens shift that may result from tracking.

In this case, assume that the light flux entering the objective optical system through the collimating lens common to the light flux from each light source is parallel or approximately parallel. (Here "approximately parallel" refers to the state wherein the angle formed by the optical axis and the marginal beam of the light flux is within +1 degree). Then there is a difference in the wavelengths of the light source for recording and/or reproduction of information for each of optical discs. Accordingly, a preferred distance from the collimating lens to the light source is different for each of the first through third light sources, depending on the chromatic aberration of the collimating lens. This makes it difficult to integrate two light sources thereof into one, or all three light sources into one. Another problem is that, if the two or three light sources are integrated into one, a trouble occurs to the aberration of the objective optical system resulting from the chromatic aberration of the collimating lens. This construction, if not improved, will raise a further problem.

To solve such problems, the present invention provides an aberration correcting device for correcting aberration. This aberration correcting device has two or more lens, and at least one of these lens is movable in the direction parallel to the optical axis. Aberration is corrected by moving the aforementioned one or more lenses to a predetermined position. Thus, two of the three light sources having different wavelengths can be integrated into one piece or all of them can be integrated into one piece, without changing the distance between the collimating lens and light source. Further, it is preferred that the first magnification M1 through third magnification M3 of the objective optical systems with respect to the first through third light fluxes have the relationship of M1=M2=M3=0. Consequently, it is also possible to make such arrangements that the aberration correcting device is mounted on the objective optical system side of the collimating lens, and two lenses—at least one negative lens and at least one positive lens—are used for configuration. This arrangement allows the parallel or approximately parallel light flux from the collimating lens to be launched into the objective optical system as the parallel or approximately parallel light flux. Further, since the aberration correcting device uses a negative lens, chromatic aberration can be corrected effectively. This arrangement is preferred also for the reason that the configuration of the optical pickup apparatus is simplified by common use of the collimating lens or integration of the light sources into one piece, and downsizing of the apparatus and reduction of production cost are achieved.

The same configuration of this optical pickup apparatus as that of the aforementioned invention provides the same advantages, and therefore will not be described to avoid duplication.

In the present invention, the phase structure is based on the diffraction structure. Use of the diffraction structure in the phase structure as in the present invention improves the properties of the objective optical system compatible with three types of optical discs having different recording densities.

A still further specific arrangement of the present invention is characterized in that the aforementioned aberration correcting device is used to correct the aberration. Thus, for recording/reproduction of the information using the first through third optical information recording media, the aforementioned aberration correcting device corrects the spherical aberration resulting from changes in the wavelength caused by the configuration as one collimating lens, while the first magnification M1 through the third magnification M3 of objective optical systems are kept to have the relationship of M1=M2=M3=0. As a result, an optical pickup apparatus having a single collimating lens is configured, and downsizing of the apparatus and reduction of production cost are preferably achieved.

In the present invention, the aforementioned aberration correcting device is arranged on the light source side of the objective optical system and on the objective optical system side of the collimating lens within the common optical path for transmission of the first, second and third light fluxes. The optical parts for the first light flux and those of the second and third optical parts can be standardized as common parts. This is because aberration correcting device is arranged on the light source side of the objective optical system and on the objective optical system side of the collimating lens within the common optical path for transmission of the first, second and third light fluxes, as in the present invention. Thus, this arrangement reduces the number of the parts used in the optical pickup apparatus and simplifies the configuration, with the result that the optical pickup apparatus production cost is reduced.

In a still further specific arrangement of the present invention, the aberration correcting device is characterized by moving one lens alone. Since the aberration correcting device is characterized by moving one lens alone as in the present invention, the aberration can be corrected by the smallest number of lenses. This arrangement provides a simplified mechanism for lens movement, and achieves downsizing of the apparatus and reduction of the apparatus production cost.

In a still further specific arrangement of the present invention, the aberration correcting device meets the following conditions:

$$0.001 < |\delta BEML/fBEML| < 0.02 \qquad (2)$$

where $\delta BEML$ denotes the amount of the lens movement in the aberration correcting device and $fBEML$ indicates the focal distance of the moving lens relative to the first light source wavelength in the aberration correcting device.

Since the aberration correcting device satisfies the Eq. (2), the objective optical system can be used with the first magnification M1 through the third magnification M3 maintaining the relationship of M1=M2=M3=0. The aforementioned value should not exceed the upper and lower limits of the Eq. (2). This is because, when common lens are used for the collimating lens for the first light flux and that for the second light flux, the levels of divergence of the first and second light fluxes entering the objective optical system through these common optical parts are mutually affected by the chromatic aberration of the common optical parts. To put it more specifically, if the first and second light fluxes having different levels of divergence enter the objective optical system that fails to meet the Eq. (2), spherical aberration may occur to any of the light fluxes.

Even if the limits of the condition specified in Eq. (2) have been exceeded, the same level of divergence can be provided between the first light flux entering the objective optical system and the second light flux entering the objective optical system, when a chromatic aberration correcting device having the function of correcting the chromatic aberration of the common optical parts is arranged in the optical path common to the first and second light fluxes. Such a chromatic aberration correcting device can be a doublet lens comprising positive and negative lenses having wavelength dispersion different from each other, or a diffraction optical device. The aforementioned chromatic aberration correcting device can be a device independent from the aforementioned common optical parts such as the aforementioned collimating lens and aberration correcting device, or can be installed inside the common optical parts. However, use of such a chromatic aberration correcting device will be accompanied by an increased number of parts, difficult processing, complicated configuration of the apparatus and increased production cost. To ensure simple apparatus structure and reduced production cost, it is preferred not to use them.

According to the present invention, at least two of the first, second and third light sources are formed in one piece. The configuration of the optical pickup apparatus is further simplified by using the light source unit with a plurality of light sources integrated into one piece, as in the present invention. In this case, the light source unit with a plurality of light sources integrated into one piece can be the one including a light emitting section for emitting the first light flux and a light emitting section for emitting the second light flux formed on an identical substrate, or a light emitting section for emitting the second light flux and a light emitting section for emitting the third light flux formed on an identical substrate. Alternatively, this light source unit can be the one including a semiconductor chip for emitting the first light flux and a semiconductor chip for emitting the second light flux incorporated in one casing, or a semiconductor chip for emitting the second light flux and a semiconductor chip for emitting the third light flux incorporated in one casing. Further reduction in the number of parts can be achieved by using a light source unit with all light sources from the first through third light sources integrated into one piece. This arrangement allows the apparatus to be downsized, and is preferably used. Further, when the light source unit comprises the light sources wherein two of the first, second and third light sources are integrated in one piece, the apparatus will be preferably simplified and downsized if the remaining one light source is formed integrally with an optical detector for the light flux of the light source.

The present invention provides an optical pickup apparatus and optical information recording and/or reproduction apparatus. This optical pickup apparatus carries an objective optical system, which has a phase structure and provides adequate recording and/or reproduction of information using three types of discs having different recording densities including a high-density optical disc based on a blue-violet laser light source, DVD and CD. This optical pickup apparatus is further characterized by simplified construction and low production cost.

BRIEF DESCRIPTION OF THE INVENTION

Figure 9:
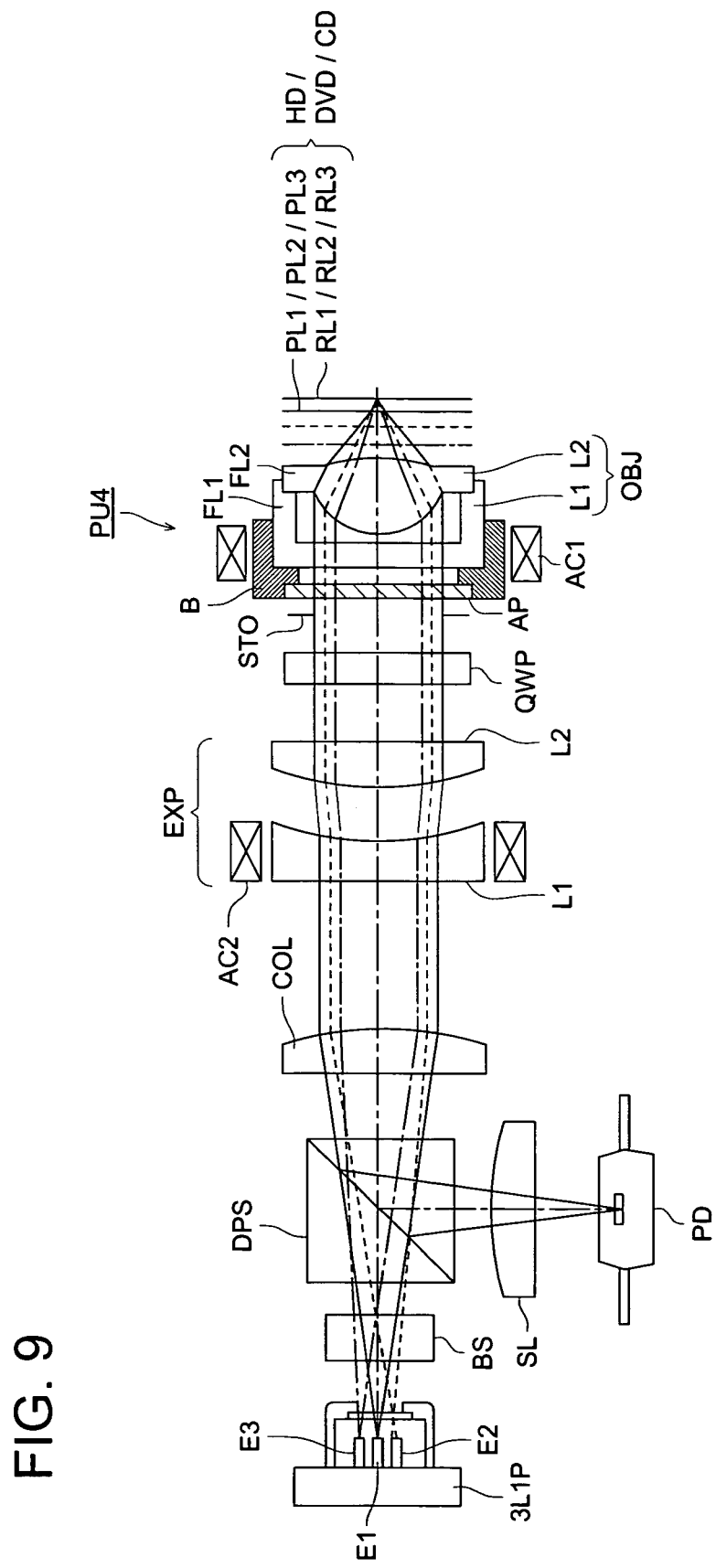
Figure 10:
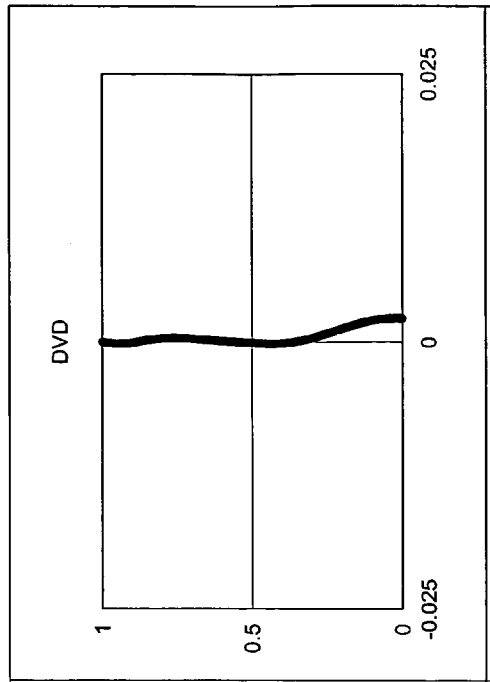
Figure 10:
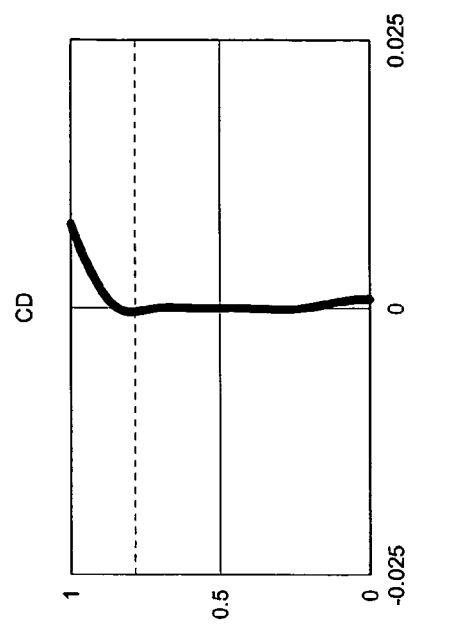
Figure 10:
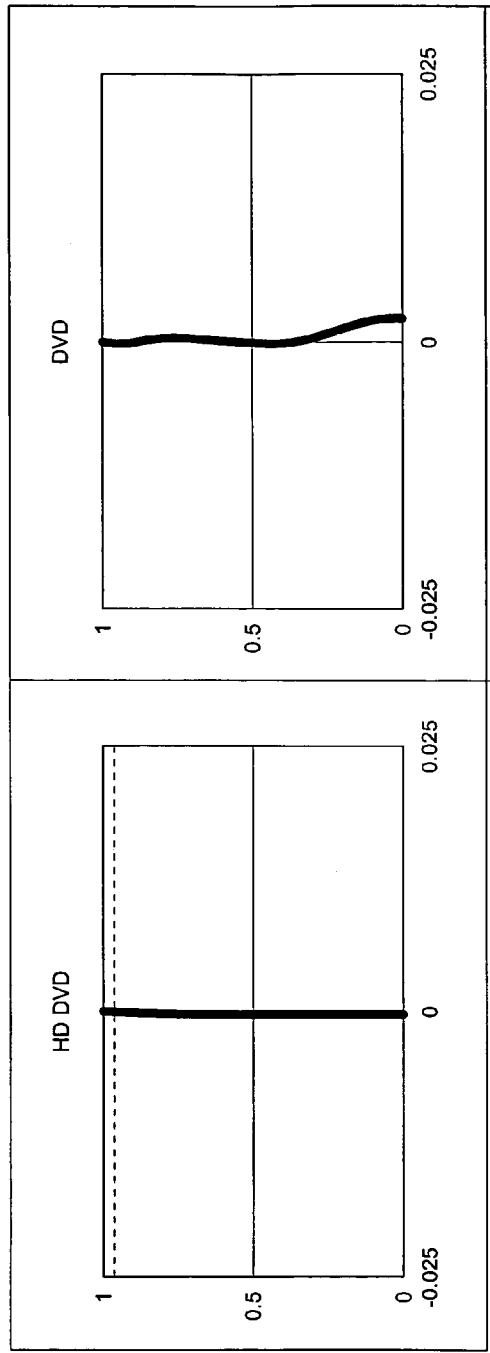

FIG. 9 is a schematic view of a configuration of fourth optical pickup apparatus PU4; and FIG. 10 is a view showing the longitudinal spherical aberration of light flux (HD) having wavelength $\lambda 1$, light flux (DVD) having wavelength $\lambda 2$ and light flux (CD) having wavelength $\lambda 3$ in an embodiment.

DETAILED DESCRIPTION OF THE INVENTION

The following describes the best form of embodiment with reference to drawings:

Embodiment 1

Figure 5:
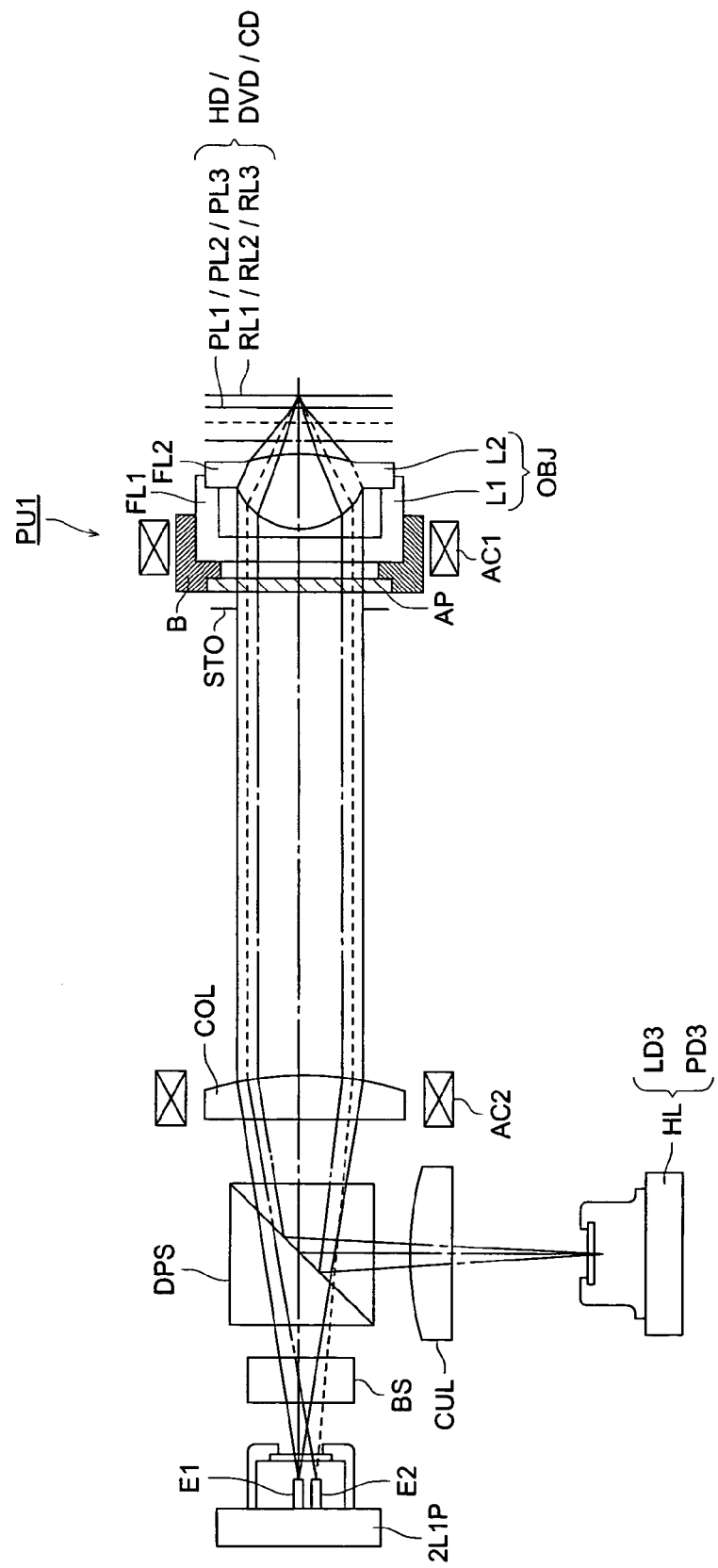
FIG. 5 is a schematic view of a configuration of first optical pickup apparatus PU1.

FIG. 5 is a schematic view of a configuration of first optical pickup apparatus PU1 capable of adequate recording/reproduction with a simple configuration, using any one of high-density optical disc HD (first optical disc), DVD (second optical disc) and CD (third optical disc). In terms of optical specifications, high-density optical disc HD is characterized by first wavelength $\lambda 1$ of 408 nm, first protective layer PL1 having a thickness t1 of 0.1 mm and numerical aperture NA1 of 0.85. The DVD is characterized by the second wavelength $\lambda 2$ of 658 nm, the second protective layer PL2 having a thickness t2 of 0.6 mm, and the numerical aperture NA2 of 0.60. The CD is characterized by the third wavelength $\lambda 3$ of 785 nm, the third protective layer PL3 having a thickness t3 of 1.2 mm, and the numerical aperture NA3 of 0.45.

The relationship of the recording densities ($\rho 1$, $\rho 2$ and $\rho 3$) among the first, second and third optical discs can be represented as $\rho 3 < \rho 2 < \rho 1$. When information is recorded and/or reproduced using each of the first, second and third optical discs, the magnifications (first magnification M1, second magnification M2 and third magnification M3) of objective optical system OBJ are expressed as M1=M2=M3=0. However, the combinations between the wavelength, thickness of the protective layer, numerical aperture, recording density and magnification are not restricted to this example.

Optical pickup apparatus PU1 comprises two-laser one-package 2L1P, hologram laser HL, objective optical system OBJ, aperture restricting device AP, biaxial actuator AC1, uniaxial actuator AC2, aperture STO corresponding to the numerical aperture NA1 of high-density optical disc HD, dichroic prism DPS, collimating lens COL (movable device), coupling lens CUL, and beam shaping device SH. In this case, the aforementioned two-laser one-package 2L1P incorporates the following two sections in one and the same package:

first emitting section EP1 (first light source) for emitting a laser light flux having a wavelength of 408 nm (first light flux) at the time of recording/reproduction of information using high-density optical disc HD; and second emitting section EP2 (second light source) for emitting a laser light flux having a wavelength of 658 nm (second light flux) at the time of recording/reproduction of information using the DVD. The aforementioned hologram laser HL incorporates an infrared semiconductor laser LD3 (third light source) for emitting the laser light flux (third light flux) having a wavelength of 785 nm at the time of recording/reproduction using a CD, and optical detector PD3 built integrally therewith. The aforementioned objective optical system OBJ comprises:

aberration correcting device L1 with a diffraction structure as a phase structure formed on the optical surface; and light converging device L2, having both spherical surfaces, for ensuring that the laser light flux passing through this aberration correcting device L1 is condensed on the information recording surfaces RL1, RL2 and RL3.

In first optical pickup apparatus PU1, when performing recording/reproduction of information using high-density optical disc HD, two-laser one-package 2L1P is actuated so that first emitting section EP1 will emit light. As the optical path is shown by a solid line in FIG. 5, the divergent light flux emitted from the first emitting section EP1 passes through beam shaping device SH, whereby the cross sectional profile is changed from an ellipse to a circle. The light flux passes through dichroic prism DPS, and is formed into a parallel light flux through collimating lens COL. Then the diameter of the light flux is adjusted. The light flux passes through aperture restricting device AP, and is turned into a spot formed on information recording surface RL1, by objective optical system OBJ through first protective layer PL1. Objective optical system OBJ performs focusing and tracking by means of biaxial actuator AC1 arranged in the surrounding area. The reflected light flux modulated by the information pit on the information recording surface RL1 again passes through objective optical system OBJ and aperture restricting device AP, and is turned into convergent light by collimating lens COL. After passing through dichroic prism DPS and beam shaping device BS, the light is received by a light detector (not illustrated) in the two-laser one-package 2L1P or located close thereby. The information recorded on high-density optical disc HD is read using the output signal of this optimal detector.

In first optical pickup apparatus PU1, when recording/reproduction of information is performed using the DVD, collimating lens COL is moved by uniaxial actuator AC2 to ensure that the second light flux in the parallel state is emitted from collimating lens COL, and the distance between objective optical system OBJ and collimating lens COL will be smaller than when recording/reproduction of information is performed using high-density optical disc HD. After that, two-laser one-package 2L1P is actuated so that light is emitted from second emitting section EP2. It is also possible to make such arrangements that, after light has been emitted from second emitting section EP collimating lens COL is moved while the optimum position is searched.

As the optical path is indicated by a dotted line in FIG. 5, the divergent light flux emitted from second emitting section EP2 passes through beam shaping device SH, whereby the cross sectional profile is changed from an ellipse to a circle. The light flux passes through dichroic prism DPS, and is formed into a parallel light flux through collimating lens COL. Then the diameter of the light flux is adjusted by aperture STO. The light flux passes through aperture restricting device AP, and is turned into a spot formed on information recording surface RL2, by objective optical system OBJ through second protective layer PL2. Objective optical system OBJ performs focusing and tracking by means of biaxial actuator AC1 arranged in the surrounding area. The reflected light flux modulated by the information pit on the information recording surface RL2 again passes through objective optical system OBJ and aperture restricting device AP, and is turned into convergent light by collimating lens COL. After passing through dichroic prism DPS and beam shaping device BS, the light is received by a light detector (not illustrated) in the two-laser one-package 2L1P or located close thereby. The information recorded on the DVD is read using the output signal of this optical detector.

In first optical pickup apparatus PU1, when recording/reproduction of information is performed using the CD, collimating lens COL is moved by uniaxial actuator AC2 to ensure that the third light flux in the parallel state is emitted from collimating lens COL. After that, hologram laser HL is actuated so that light is emitted from semiconductor laser LD3. It is also possible to make such arrangements that, after light has been emitted from semiconductor laser LD3, collimating lens COL is moved while the optimum position is searched.

As the optical path is indicated by one-dot chain line in FIG. 5, the divergent light flux emitted from semiconductor laser LD3 passes through coupling lens CUL and is reflected by the dichroic prism DPS, whereby it is formed into a parallel light flux through collimating lens COL. Then the diameter of the light flux is adjusted by aperture STO. The light flux passes through aperture restricting device AP, and is turned into a spot formed on information recording surface RL3, by objective optical system OBJ through third protective layer PL3. Objective optical system OBJ performs focusing and tracking by means of biaxial actuator AC1 arranged in the surrounding area. The reflected light flux modulated by the information pit on the information recording surface RL3 again passes through objective optical system OBJ and aperture restricting device AP, and is turned into convergent light by collimating lens COL. Having been reflected by dichroic prism DPS, the light is received by light detector PD3 of hologram laser HL. The information recorded on CD is read using the output signal of light detector PD3.

The following describes the configuration of objective optical system OBJ: The aberration correction device L1 includes a plastic lens having a refraction index nd of 1.5091 and Abbe's number vd of 56.5. The refractive index is 1.5242 for wavelength λ1, 1.5064 for the wavelength λ2 and 1.5050 for the wavelength λ3. Further, the light converging device L2 is a plastic lens having a refraction index nd of 1.5435 and Abbe's number vd of 56.3. Flanges FL1 and FL2 formed integrally with the optically functioning section are provided around each of the optically functioning sections (the area, for aberration correction device L1 and light converging device L2, where the first light flux passes). The aberration correction device L1 is made integral with the light converging device L2 by connecting parts of flanges FL1 and FL2. The aberration correction device L1 can be made integral with the light converging device L2, using a mirror frame of a separate member.

Figure 1:
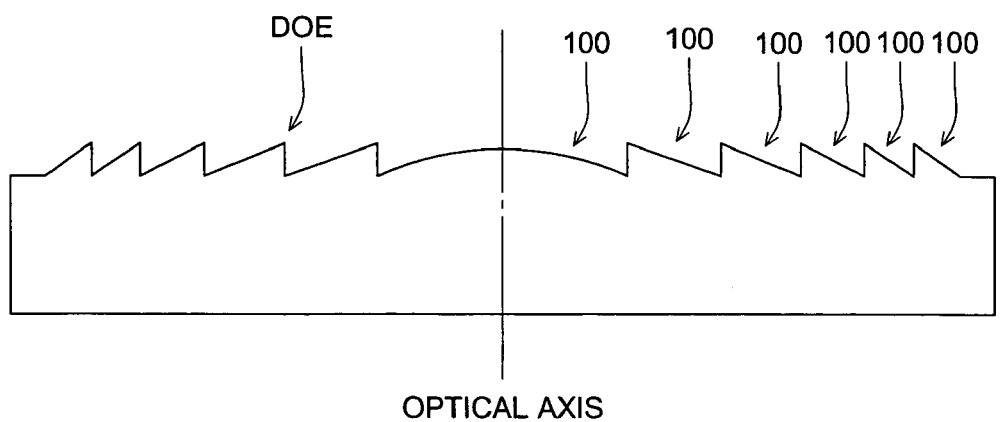
FIG. 1 is a diagram representing an example of a diffraction structure.
Figure 1:
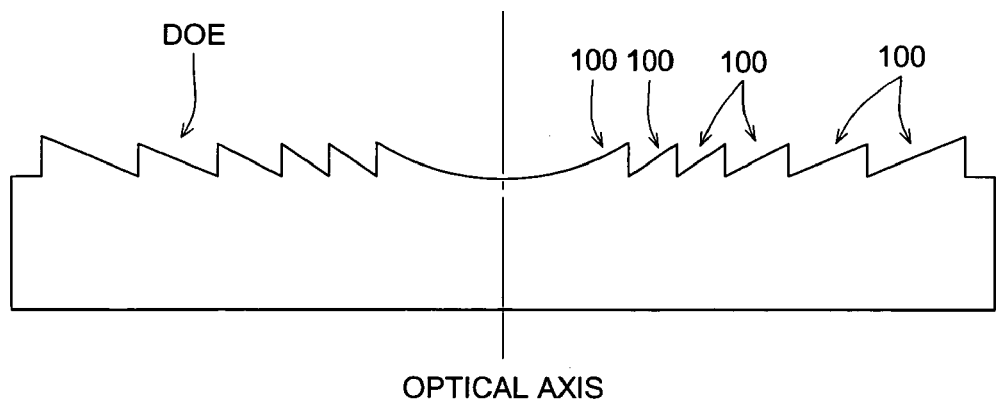
Figure 2A:
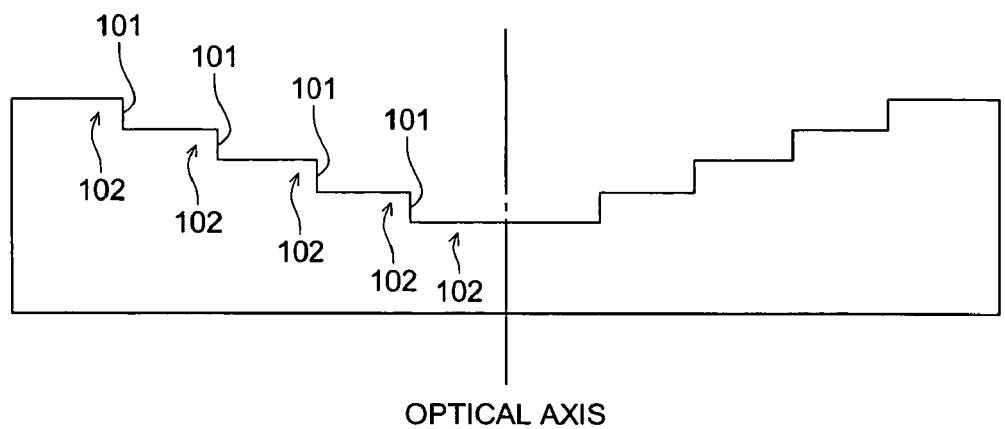
FIG. 2 is a diagram representing another example of the diffraction structure.
Figure 2B:
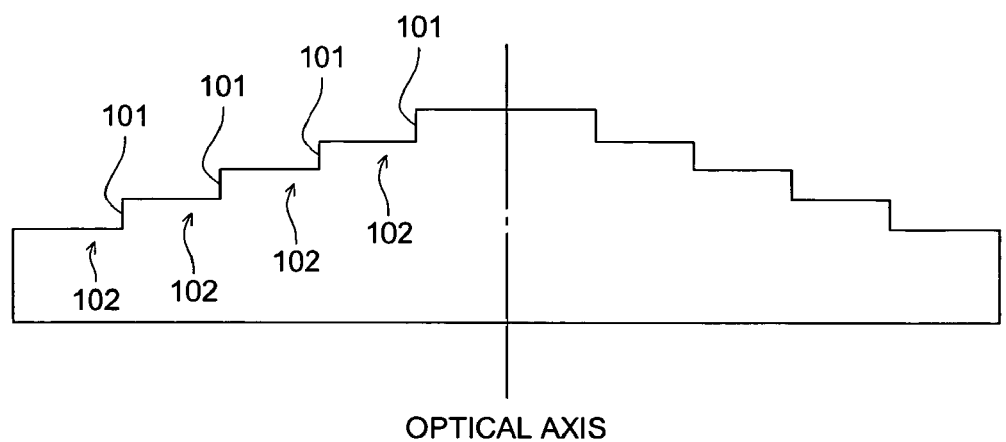
Figure 3:
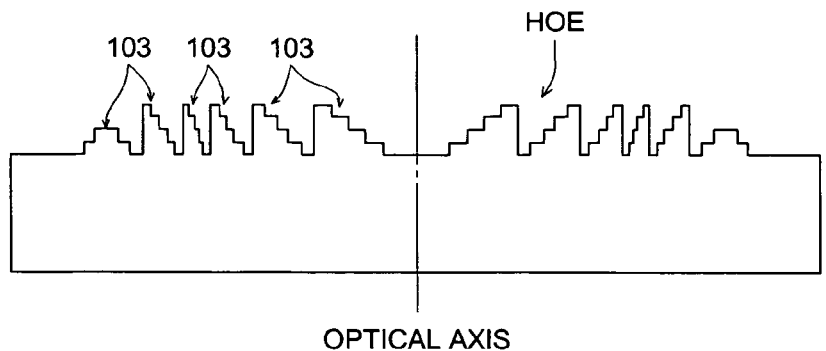
FIG. 3 is a diagram representing still another example of the diffraction structure.
Figure 3:
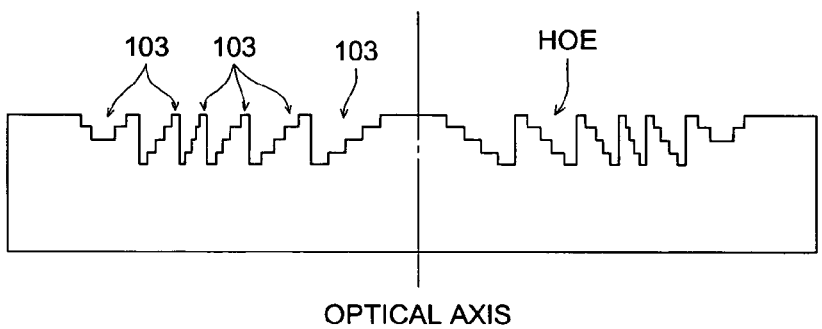
Figure 3:
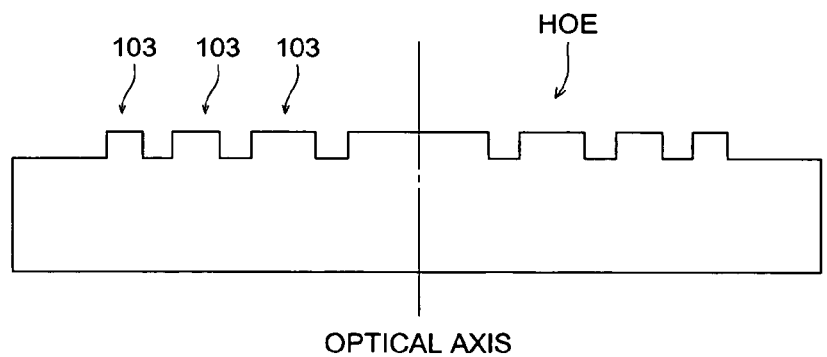
Figure 3:
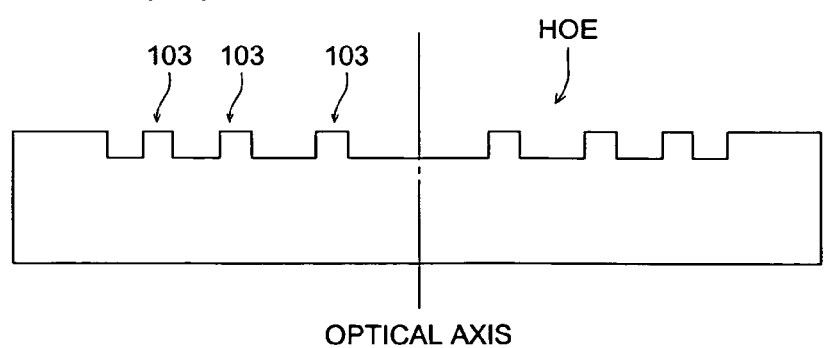
Figure 4:
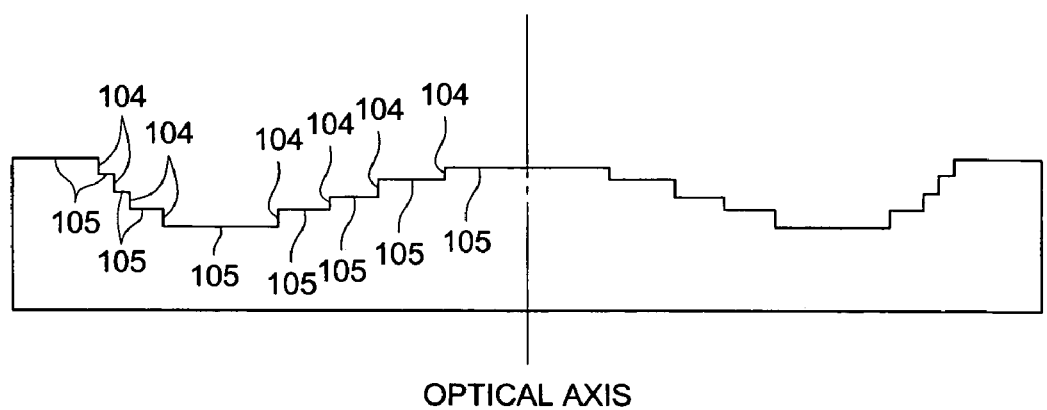
FIG. 4 is a diagram showing an example of a phase difference assigning structure.
Figure 4:
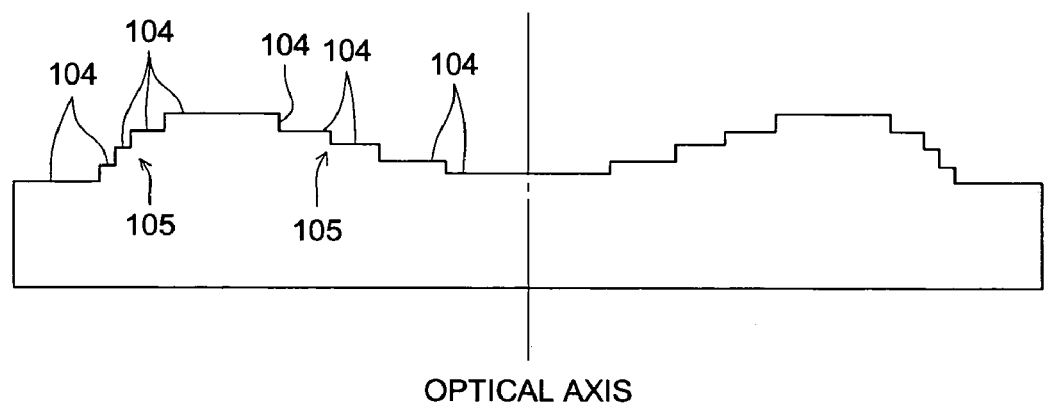
Figure 6:
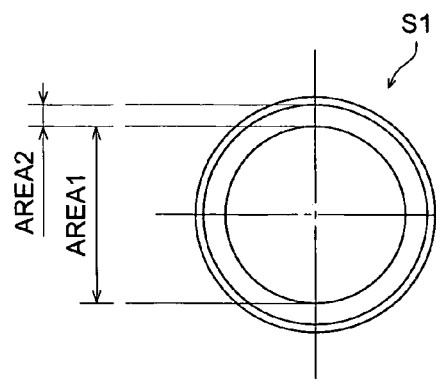
FIG. 6 is a front view (a), a side view (b) and a rear view (c) of objective optical system OBJ.
Figure 6:
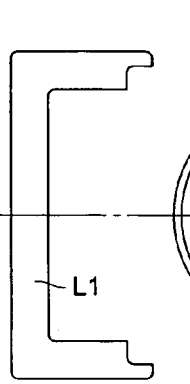
Figure 6:
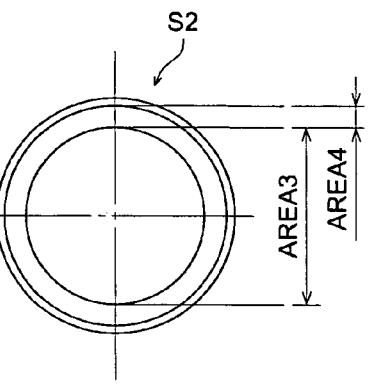

As shown in FIG. 6, optical plane S1 of aberration correction device L1 on the side of the semiconductor laser beam source side is divided into first area AREA 1 including the optical axis corresponding to the area in the NA2, and second area AREA 2 corresponding to the area from the NA2 to NA1. First area AREA 1 contains diffraction structure HOE 1 as a diffraction structure (hereinafter referred to as "diffraction structure HOE 1") wherein a plurality of straps with stepped structures formed inside are arranged around the optical axis, as shown in FIGS. 3(a) and (b).

In diffraction structure HOE 1 formed in first area AREA 1, depth D of the stepped structure formed inside each strap is set to the value calculated from the following equation:

$$D \cdot (N1-1) \cdot /\lambda 1 = 2 \cdot q \qquad (4)$$

Number of divisions P inside each strap is set to 5. "λ1" denotes the wavelength of the laser light flux emitted from first emitting section EP1 expressed in terms of microns (here λ1=0.408 μm). "N1" indicates the medium refraction index of aberration correction device L1 relative to wavelength λ1. "q" represents a natural number.

When the first light flux of the first wavelength λ1 is launched into the stepped structure wherein depth D in the direction of optical axis is set in this manner, an optical path difference of 2×λ1 (μm) is created between the adjacent stepped structures, virtually without phase difference assigned to the first light flux. Thus, the light flux passed by without being diffracted (referred to as "zero-th order diffracted light" in the present Specification).

When the third light flux of the third wavelength λ3 (here λ3=0.785 μm) is launched into this stepped structure, an optical path difference of (2×λ1/(N1−1)·(N3−1)/λ3)×λ3 (μm) is created between the adjacent stepped structures, where "N3" denotes the medium refraction index of aberration correction device L1 relative to wavelength λ3. In third wavelength λ3, the (N3−1)/λ3 is approximately two times (N1−1)/λ1. Thus, an optical path difference of approximately 1×λ3 (μm) is created between adjacent stepped structures. Similarly to the case of the first light flux, the third light flux is virtually not assigned with a phase difference, and passes by as zero-order diffracted light.

When the second light flux of the second wavelength λ2 (here λ2=0.658 μm) is launched into this stepped structure, an optical path difference of {2×λ1/(N1−1)×(N2−1)/λλ2}× λ2={2×0.408/(1.5242−1)×(1.5064−1)/0.658}×λ2=1.199·λ2 (μm) is created between the adjacent stepped structures. Since number of divisions P inside each strap is set to 5, an optical difference corresponding to one wavelength of the second wavelength λ2 is created between adjacent straps ((1.199−1)×5≈1). The second light flux is diffracted in the direction of positive first order (positive first order diffracted light). The diffraction efficiency of the positive first order diffracted light of the second light flux in this case is 87.5%. This is sufficient for recording/reproduction of information using the DVD.

As shown in FIG. 6, optical plane S2 of aberration correction device L1 on the side of the optical disc side is divided into third area AREA 3 including the optical axis corresponding to the area in the NA3, and fourth area AREA 4 corresponding to the area from the NA3 to NA1. Third area AREA 3 contains diffraction structure HOE 2 wherein a plurality of straps with stepped structures formed inside are arranged around the optical axis, as shown in FIGS. 3(c) and (d).

In the diffraction structure HOE 2 formed in the third area AREA 3, the depth D of the stepped structures formed inside each strap is set to the value calculated from the following equation:

$$D \cdot (N1-1)/\lambda 1 = 5 \cdot q \quad (5)$$

Number of divisions P inside each strap is set to 2. "λ1" denotes the wavelength of the laser light flux emitted from third emitting section EP1 expressed in terms of microns (here λ1=0.408 μm). "N1" indicates the medium refraction index of aberration correction device L1 relative to wavelength λ1. "q" represents a natural number.

When the first light flux of the first wavelength λ1 is launched into the stepped structure wherein depth D in the direction of optical axis is set in this manner, an optical path difference of 5×λ1 (μm) is created between the adjacent stepped structures, virtually without phase difference assigned to the first light flux. Thus, the light flux passed by as zero-th order diffracted light, without being diffracted.

When the second light flux having second wavelength λ2 (here λ2=0.658 μm) is launched into this stepped structure, an optical path difference of (5×λ1/(N1−1)·(N2−1)/λ2)×λ2 (μm) is created between the adjacent structures. Here "N2" denotes the medium refraction index of aberration correcting device L1 relative to wavelength λ2. In the second wavelength λ2, a ratio of (λ2/(N2−1) to λ1/(N1−1) is approximately 5 to 3. Thus, an optical path of approximately 3×λ2 (μm) is formed between adjacent stepped structures. Similarly to the first light flux, the second light flux is not assigned virtually with a phase difference, and therefore passes by as a zero-th order diffracted light without being diffracted.

When the third light flux having third wavelength λ3 (here λ3=0.785 μm) is launched into this stepped structure, an optical path difference of {5×λ1/(N1−1)×(N3−1)/λ3}× λ3={5×0.408/(1.5242−1)×(1.5050−1)/0.785}×λ3=2.5·λ3 (μm) is created between the adjacent structures. Since the number of divisions P inside each strap is set to 2, the third light flux is diffracted in the ± first-order directions (positive and negative directions) at almost the same efficiency. In the present embodiment, the positive first-order diffracted light is employed for recording/reproduction of information using the CD. The diffraction efficiency of the positive first-order diffracted light of the second light flux in this case is a little more than 40 percent. The negative first-order light is formed in a flare.

To improve the diffraction efficiency of the positive first-order diffracted light, it is effective to optimize the tilts of the surface parallel to the optical axis of the stepped form and the surface not parallel with the optical axis, for example. Alternatively, the surface not parallel with the optical axis is slightly changed from the profile preferred from the viewpoint of wave front aberration. This arrangement improves the diffraction efficiency. It is also possible to improve the diffraction efficiency by changing the dispersion of medium of the material constituting the L1 and the number of divisions P of the stepped form.

Light converging device L2 is designed to minimize the spherical aberration with respect to the combination of first wavelength λ1, magnification M1=0 and first protective layer PL1. When first magnification M1 with respect to the first light flux, second magnification M2 with respect to the second light flux and third magnification M3 with respect to the third light flux are zero as in the case of the present embodiment, the spherical aberration of the second light flux having passing through light converging device L2 and second protective layer PL2 and the spherical aberration of the third light flux having passing through light converging device L2 and third protective layer PL3 are set in the excessively corrected direction, depending on the differences in the thickness of first protective layer PL1, second protective layer PL2 and third protective layer PL3.

The straps of diffraction structure HOE 1 provided on optical surface S1 on the side of the semiconductor laser beam, and the straps of diffraction structure HOE 2 provided on optical surface S2 of aberration correction device L1 on the side of the optical disc are each set in such a way that the spherical aberration in the direction of insufficient correction is added to the positive first-order diffracted light by diffraction, when the second and third light fluxes have been applied. The amount of the spherical aberration added by diffraction structure HOE 1 and diffraction structure HOE 2 offsets the spherical aberration in the direction of excessive correction resulting from the differences in the thicknesses of protective layer PL1, protective layer PL2 and protective layer PL3. Thus, the second light flux having passed through diffraction structure HOE 2 and third protective layer PL3 forms a satisfactory spot on the information recording surface RL2 of the DVD. The third light flux having passed through diffraction structure HOE 2 forms a satisfactory spot on the information recording surface RL3 of the CD.

If the aforementioned diffraction structure HOE is provided on each of two sides, all the magnification rates M1, M2 and M3 of each light flux can be set to "0" when one objective optical system is used for three types of optical discs. Setting all the magnification rates for image formation to "0" will solve the problems of comatic aberration that may be caused by lens shift due to tracking for recording/reproduction of information using all the optical discs ranging from the first to third discs. This arrangement is preferred.

In the present embodiment, diffraction structure HOE is provided on each side of the aberration correction device L1. It is also possible to install at least one diffraction structure HOE on the light converging device L2. If diffraction structures HOE are provided on two sides, it is possible to get the same effect as that of the aforementioned diffraction structures HOE provided on both sides.

Further, diffraction structures DOE 1 and DOE 2 as the diffraction structures each comprising a plurality of straps having a serrated form in the cross section including the optical axis (hereinafter referred to as "diffraction structures DOE") can be formed in second area AREA 2 of optical surface S1 of aberration correction device L1 on the side of the semiconductor laser light source or fourth area AREA 4 of optical surface S2 on the optical disc side.

The diffraction structure DOE 1 is designed to reduce the chromatic aberration of the objective optical system OBJ in the blue-violet area and the changes in spherical aberration resulting from temperature changes. These problems will be serious particularly when light converging device L2 comprises a plastic lens. The diffraction structure DOE 2 is designed to reduce the chromatic aberration of objective optical system OBJ in the blue-violet and red areas, and the changes in spherical aberration resulting from temperature changes. These problems will be serious particularly when light converging device L2 is composed of a plastic lens.

In the diffraction structure DOE 1, height d1 of the level difference closest to the optical axis is designed to ensure that diffraction efficiency of the diffracted light of a desired order will be 100 percent with respect to a wavelength of 390 through 420 nm. If the first light flux enters the diffraction structure DOE 1 where the depth of the level difference is set, the diffracted light is produced at a diffraction efficiency of 95 percent or more. This provides sufficient diffraction efficiency. At the same time, chromatic aberration can be corrected in the blue-violet area.

In the diffraction structure DOE 2, height d1 of the level difference closest to the optical axis is designed to ensure that diffraction efficiency of the diffracted light of a desired order will be 100 percent with respect to a wavelength of 390 nm. (The refraction index of aberration correction device L1 relative to the wavelength of 390 nm is 1.5273). If the first light flux enters the diffraction structure DOE 1 where the depth of the level difference is set, positive second-order diffracted light is produced at a diffraction efficiency of 96.8 percent. If the second light flux enters this structure, positive first-order diffracted light is produced at a diffraction efficiency of 93.9 percent. This provides sufficient diffraction efficiency. At the same time, when chromatic aberration is corrected in the blue-violet area, excessive correction of chromatic aberration in the wavelength area of the second light flux does not occur. Here the diffraction efficiency is portioned out to the first light flux and second light flux. It is also possible to make such arrangements that importance is attached to the diffraction efficiency of the first light flux, by optimization with respect to wavelength λ1.

In objective optical system OBJ according to the present embodiment, diffraction structures DOE are not provided. Diffraction structures DOE can be installed on the optical surface of the light converging device L2, except for second area AREA 2 and fourth area AREA 4. In this case, one diffraction structure DOE can be provided wherein the entire optical surface area provided with diffraction structure DOE for the light converging device L2 is assumed as one area. Alternatively, diffraction structure DOE different for each area can be installed, wherein the optical surface provided with diffraction structure DOE for light converging device L2 is assumed as corresponding to two or three areas concentric about the optical axis. For the diffraction efficiency in each area in this case, diffraction efficiency should be portioned out to the first through third light fluxes in the common area through which the first through third light fluxes pass. (For example, if the height of the level difference is designed in such a way that the diffraction efficiency will be 100 percent with respect to the wavelength of 390 nm (the refraction index of the aberration correction device L1 relative to the wavelength of 390 nm is 1.5273), then diffraction efficiency can be separately assigned for each light flux; viz., positive second-order diffracted light occurs at a diffraction efficiency of 96.8 percent when the first light flux is applied; positive first-order diffracted light occurs at a diffraction efficiency of 93.9 percent when the second light flux is applied; and positive first-order diffracted light occurs at a diffraction efficiency of 99.2 percent when the third light flux is applied.) In the area through which the first and second light fluxes pass, the diffraction efficiency should be portioned out to the first and second light fluxes. It is also possible to make such arrangements that importance is attached to the diffraction efficiency of the first light flux, by optimization with respect to wavelength λ1.

Diffraction structures DOE 1 and DOE 2 has dependency of spherical aberration on wavelength in such a way that, when the wavelength of the incoming light flux is increased in the blue-violet color (short wavelength) area, the spherical aberration changes in the direction of insufficient correction; and, when the wavelength of the incoming light flux is decreased, the spherical aberration changes in the direction of excessive correction. This offsets the change in spherical aberration that may occur to the light converging device resulting from a change in environmental temperature, thereby expanding the working temperature range of objective optical system OBJ as a plastic lens of high NA value.

In the aberration correction device L1 according to the present embodiment, diffraction structure HOE can be formed on both of optical surfaces S1 and S2 on the side of the semiconductor laser light source. Alternatively, diffraction structure DOE can be formed on one of optical surfaces S1 and S2, with diffraction structure HOE formed on the other.

Collimating lens COL is arranged inside the common optical path for the aforementioned first through third light fluxes. Arrangements are made in such a way that the position can be adjusted in the direction of optical axis by uniaxial actuator AC2. As described above, the chromatic aberration among first wavelength λ1, second wavelength λ2 and third wavelength λ3 can be absorbed, and the light flux of any wavelength as a parallel flux can be emitted from collimating lens COL. Collimating lens COL is shifted in the direction of optical axis at the time of recording/reproduction of information using a high-density optical disc HD. This procedure corrects the spherical aberration of the spot formed on information recording surface RL1 of high-density optical disc HD, and ensures satisfactory recording/reproduction of information using high-density optical disc HD at all times.

The causes for the spherical aberration to be corrected by adjustment of the position of collimating lens COL include variations of wavelengths caused by production errors of blue-violet semiconductor laser LD1, changes in refraction index of objective optical system OBJ resulting from temperature changes, distribution of refraction index, inter-layer focus jumps on multi-layer discs such as two- and four-layer discs at the time of recording/reproduction, variations in the thickness resulting from production errors of protective layer PL1, and thickness distribution.

The above description refers to the correction of spherical aberration of the spot formed on information recording surface RL1 of high-density optical disc HD. It is also possible to arrange such a configuration that the spherical aberration of the spot formed on the information recording surface RL2 of the DVD is corrected by adjusting the position of collimating lens COL.

The present embodiment is provided with aperture restricting device AP integrally built with objective optical system OBJ through joining member B, as an aperture device for restricting the aperture corresponding to the NA2 and NA3. Tracking drive of aperture restricting device AP and objective optical system OBJ as an integrated body is carried out by biaxial actuator AC1.

Wavelength selecting filter WF for selecting the wavelength of transmittance is formed on the optical surface of aperture restricting device AP. When this wavelength selecting filter WF is used for aperture restriction of NA2, this arrangement provides wavelength selectivity of transmittance in such a way that all wavelengths from the first wavelength $\lambda 1$ through third wavelength $\lambda 3$ are allowed to pass through it in the area within the NA2, and second wavelength $\lambda 2$ and third wavelength $\lambda 3$ are shut out in the area outside the NA2, with first wavelength $\lambda 1$ alone allowed to pass through it. In the meantime, when wavelength selecting filter WF is used to restrict aperture of the NA3, this arrangement provides wavelength selectivity of transmittance in such a way that all wavelengths from the first wavelength $\lambda 1$ through third wavelength $\lambda 3$ are allowed to pass through it in the area within the NA3, and third wavelength $\lambda 3$ alone is shut out in the area outside the NA3, with first wavelength $\lambda 1$ and second wavelength $\lambda 2$ allowed to pass through it.

Wavelength selecting filter WF can be formed on the optical functioning surface of aberration correction device L1, or on the optical functioning surface of the light converging device L2. Further, since diffraction structure HOE is formed inside the first area AREA 1 corresponding to the interior of the NA2, the second light flux passing through the second area AREA 2 turns into the flare that does not make any contribution for formation of a spot on information recording surface RL2 of the DVD. This is equivalent to the fact that objective optical system OBJ has a function of restricting the aperture corresponding to the NA2, and restriction of the aperture corresponding to the NA2 is carried out by this function.

Aperture restriction method is not limited to the use of wavelength selecting filter WF. It is also possible to use the method of mechanical switching of the aperture or liquid crystal phase control device LCD to be described later.

Beam shaping device SH is used to convert the elliptical light flux from the semiconductor laser into a circular or approximately circular shape. Use of beam shaping device SH improves the efficiency of utilizing the beam from the semiconductor laser, and enhances pickup performances.

Beam shaping device SH mentioned above can be composed of a single lens of cylindrical surface having a curvature only in one direction, or an anamorphic surface having different curvature radiuses in two directions orthogonal to each other.

When beam shaping device SH is arranged in the optical path of integrated two-wavelength laser as in the configuration of the present embodiment, the positional relationship between the two laser beam emitting sections and beam shaping device SH is preferred to be as follows: In the case of a beam shaping device comprising a cylindrical surface, for example, it is preferred that the direction where the surface of the beam shaping device has no curvature should be the same as the direction where the aforementioned two laser beam emitting sections are arranged. In the case of a beam shaping device comprising an anamorphic surface, the direction where the curvature of the surface of the beam shaping device increases should be the same as the direction where the aforementioned two laser beam emitting sections are arranged. The aforementioned positional relationship between beam shaping device SH and two laser beam emitting sections removes or reduces the adverse effect of the beam shaping device upon aberration.

However, the above statement may not apply, depending on the arrangement of the laser beam emitting section and the direction of the long axis of the elliptical light flux of the semiconductor laser. The direction where beam is shaped by beam shaping device SH and the direction of the elliptical light flux of the semiconductor laser must conform to desired conditions, and compatibility with a plurality of light sources must be ensured.

Embodiment 2

Figure 7:
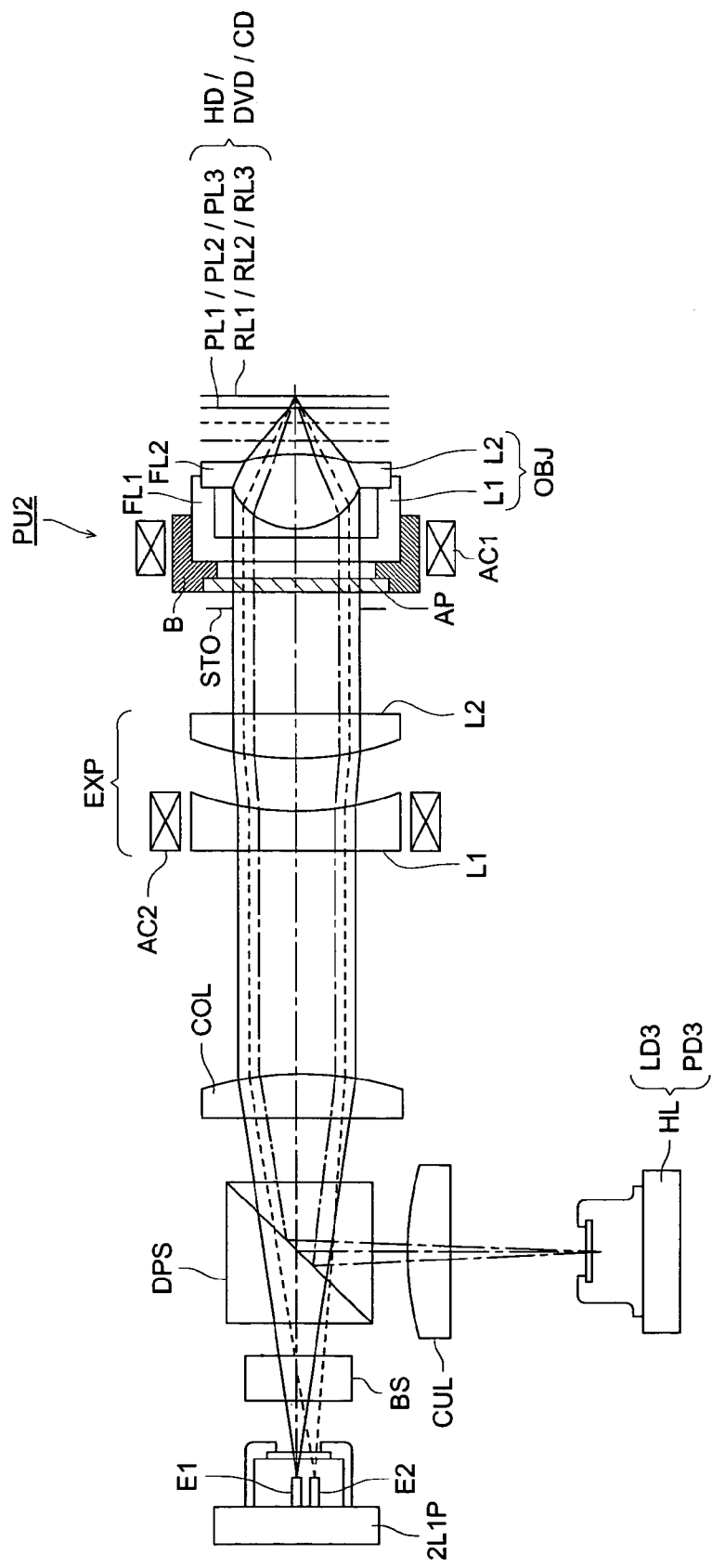
FIG. 7 is a schematic view of a configuration of second optical pickup apparatus PU2.

FIG. 7 is a schematic view of a simple configuration of second optical pickup apparatus PU2 that provides appropriate recording/reproduction of information using any of high-density optical disc HD (first optical disc), DVD (second optical disc) and CD (third optical disc). In terms of optical specifications, high-density optical disc HD is characterized by first wavelength $\lambda 1$ of 408 nm, first protective layer PL1 having a thickness t1 of 0.1 mm and numerical aperture NA1 of 0.85. The DVD is characterized by the second wavelength $\lambda 2$ of 658 nm, the second protective layer PL2 having a thickness t2 of 0.6 mm, and the numerical aperture NA2 of 0.60. The CD is characterized by the third wavelength $\lambda 3$ of 785 nm, the third protective layer PL3 having a thickness t3 of 1.2 mm, and the numerical aperture NA3 of 0.45.

The relationship of the recording densities ($\rho 1$, $\rho 2$ and $\rho 3$) among the first, second and third optical discs can be represented as $\rho 3 < \rho 2 < \rho 1$. When information is recorded and/or reproduced using each of the first, second and third optical discs, the magnifications (first magnification M1, second magnification M2 and third magnification M3) of objective optical system OBJ are expressed as M1=M2=M3=0. However, the combinations among the wavelength, thickness of the protective layer, numerical aperture, recording density and magnification are not restricted to this example.

Optical pickup apparatus PU2 comprises two-laser one-package 2L1P, hologram laser HL, objective optical system OBJ, aperture restricting device AP, biaxial actuator AC1, uniaxial actuator AC2, aperture STO corresponding to the numerical aperture NA1 of high-density optical disc HD, dichroic prism DPS, collimating lens COL (movable device), coupling lens CUL, beam shaping device SH, and beam expander EXP. In this case, the aforementioned two-laser one-package 2L1P incorporates the following two sections in one and the same package:

first emitting section EP1 (first light source) for emitting a laser light flux having a wavelength of 408 nm (first light flux) at the time of recording/reproduction of information using high-density optical disc HD; and second emitting section EP2 (second light source) for emitting a laser light flux having a wavelength of 658 nm (second light flux) at the time of recording/reproduction of information using a DVD. The aforementioned hologram laser HL incorporates an infrared semiconductor laser LD3 (third light source) for emitting the laser light flux (third light flux) having a wavelength of 785 nm at the time of recording/reproduction using a CD, and optical detector PD3 built integrally therewith. The aforementioned objective optical system OBJ comprises:

aberration correcting device L1 with a diffraction structure as a phase structure formed on the optical surface; and light converging device L2, having both spherical surfaces, for ensuring that the laser light flux passing through this aberration correcting device L1 is condensed on the information recording surfaces RL1, RL2 and RL3.

Objective optical system OBJ used here is the same as the one used for first optical pickup apparatus PU1, and will not be described to avoid duplication.

In optical pickup apparatus PU2, when performing recording/reproduction of information using high-density optical disc HD, two-laser one-package 2L1P is actuated so that first emitting section EP1 will emit light. As the optical path is shown by a solid line in FIG. 7, the divergent light flux emitted from the first emitting section EP1 passes through beam shaping device SH, whereby the cross sectional profile is changed from an ellipse to a circle. The light flux passes through dichroic prism DPS, and is formed into a parallel light flux through collimating lens COL. Then the light flux passes through beam expander EXP, and the diameter of the light flux is adjusted by the aperture STO. The light flux passes through aperture restricting device AP, and is turned into a spot formed pn information recording surface RL1, by objective optical system OBJ through first protective layer PL1. Objective optical system OBJ performs focusing and tracking by means of biaxial actuator AC1 arranged in the surrounding area. The reflected light flux modulated by the information pit on the information recording surface RL1 again passes through objective optical system OBJ, aperture restricting device AP and beam expander EXP, and is turned into convergent light by collimating lens COL. After passing through dichroic prism DPS and beam shaping device BS, the light is received by a light detector (not illustrated) in the two-laser one-package 2L1P or located close thereby. The information recorded on high-density optical disc HD is read using the output signal of this optical detector.

In optical pickup apparatus PU2, when recording/reproduction of information is performed using the DVD, the second light flux in the parallel state is emitted from collimating lens COL, and lens L1 of beam expander EXP is moved by uniaxial actuator AC2. After that, two-laser one-package 2L1P is actuated so that light is emitted from second emitting section EP2. It is also possible to make such arrangements that, after light has been emitted from second emitting section EP2, lens L1 of the beam expander EXP is moved while the optimum position is searched.

As the optical path is indicated by a dotted line in FIG. 7, the divergent light flux emitted from second emitting section EP2 passes through beam shaping device SH, whereby the cross sectional profile is changed from an ellipse to a circle. The light flux passes through dichroic prism DPS, and is formed into a parallel light flux through collimating lens COL. Then the light flux passes through beam expander EXP and the diameter of the light flux is adjusted by the aperture STO. The light flux passes through aperture restricting device AP, and is turned into a spot formed on information recording surface RL2, by objective optical system OBJ through second protective layer PL2. Objective optical system OBJ performs focusing and tracking by means of biaxial actuator AC1 arranged in the surrounding area. The reflected light flux modulated by the information pit on the information recording surface RL2 again passes through objective optical system OBJ, aperture restricting device AP and beam expander EXP, and is turned into convergent light by collimating lens COL. After passing through dichroic prism DPS and beam shaping device BS, the light is received by a light detector (not illustrated) in the two-laser one-package 2L1P or located close thereby. The information recorded on the DVD is read using the output signal of this optical detector.

In optical pickup apparatus PU2, when recording/reproduction of information is performed using the CD, the third light flux in the parallel state is emitted from collimating lens COL, and lens L1 of beam expander EXP is moved by uniaxial actuator AC2. After that, hologram laser HL is actuated so that light is emitted from semiconductor laser LD3. It is also possible to make such arrangements that, after light has been emitted from semiconductor laser LD3, collimating lens COL is moved while the optimum position is searched.

As the optical path is indicated by one-dot chain line in FIG. 7, the divergent light flux emitted from semiconductor laser LD3 passes through coupling lens CUL and is reflected by the dichroic prism DPS, whereby it is formed into a parallel light flux through collimating lens COL. Then the light flux passes through beam expander EXP and the diameter of the light flux is adjusted by aperture STO. The light flux passes through aperture restricting device AP, and is turned into a spot formed on information recording surface RL3, by objective optical system OBJ through third protective layer PL3. Objective optical system OBJ performs focusing and tracking by means of biaxial actuator AC1 arranged in the surrounding area. The reflected light flux modulated by the information pit on the information recording surface RL3 again passes through objective optical system OBJ, aperture restricting device AP and beam expander EXP, and is turned into convergent light by collimating lens COL. Having been reflected by dichroic prism DPS, the light is received by light detector PD3 of hologram laser HL. The information recorded on CD is read using the output signal of light detector PD3.

In the present embodiment, beam expander EXP as an aberration correcting device comprising concave lens L1 and convex lens L2 is arranged inside the common optical path of the first through third light fluxes. The position of concave lens L1 can be adjusted in the direction of optical axis by uniaxial actuator AC2. Thus, the parallel light fluxes, maintained in the parallel state, can be emitted from collimating lens COL. Further, if the position of the concave lens L1 is changed in the direction of optical axis at the time of recording/reproduction of information using high-density optical disc HD, the spherical aberration of the spot formed on information recording surface RL1 of high-density optical disc HD can be corrected. This arrangement ensures satisfactory recording/reproduction characteristics at all times when high-density optical disc HD is used.

The causes for the spherical aberration to be corrected by adjustment of the position of concave lens L1 include variations of wavelengths caused by production errors of blue-violet semiconductor laser LD1, changes in refraction index of objective optical system OBJ resulting from temperature changes, distribution of refraction index, inter-layer focus jumps on multi-layer discs such as two- and four-layer discs at the time of recording/reproduction, variations in the thickness resulting from production errors of protective layer PL1, and thickness distribution.

The aforementioned description refers to the method for correcting the spherical aberration of the spot formed on information recording surface RL1 of high-density optical disc HD. It is also possible to arrange such a configuration that the spherical aberration of the spot formed on information recording surface RL2 of the DVD is corrected by adjusting the position of concave lens L1.

Embodiment 3

Figure 8:
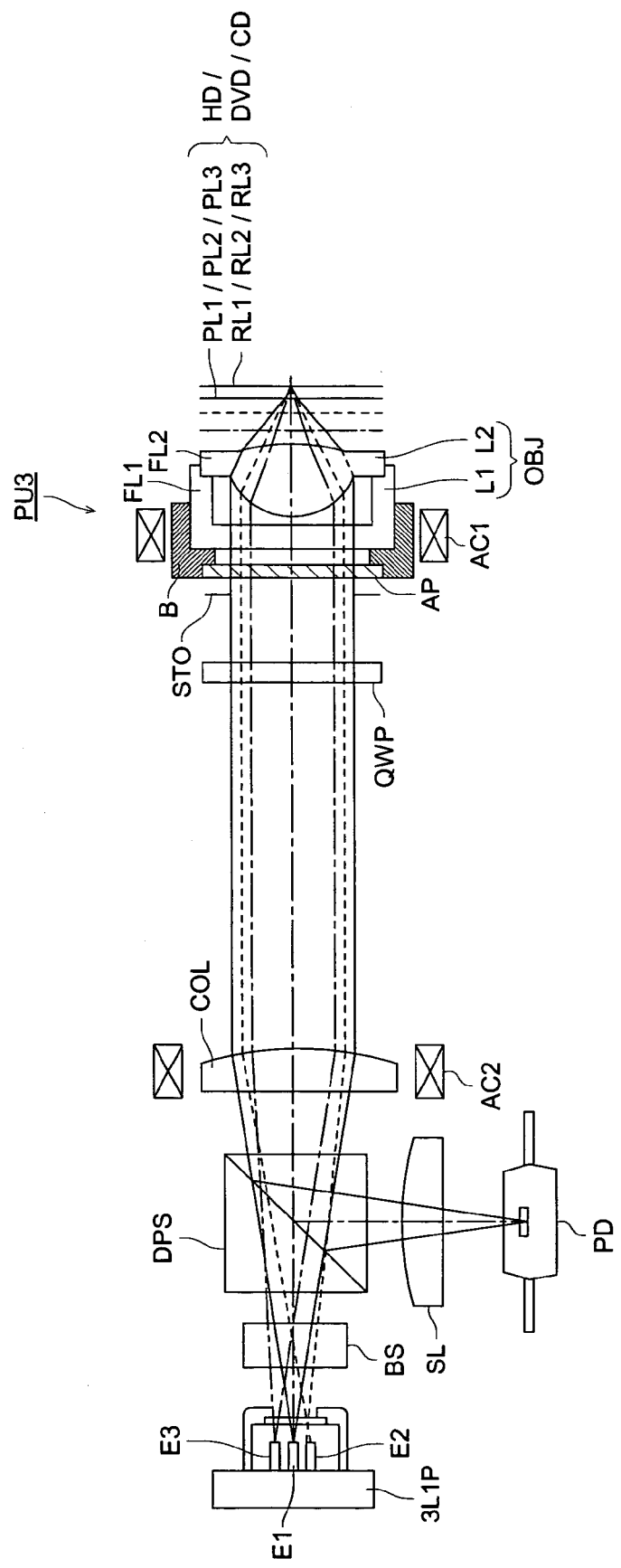
FIG. 8 is a schematic view of a configuration of third optical pickup apparatus PU3.

FIG. 8 is a schematic view of a configuration of third optical pickup apparatus PU3 that provides appropriate recording/reproduction of information using any of high-density optical disc HD (first optical disc), DVD (second optical disc) and CD (third optical disc). In terms of optical specifications, high-density optical disc HD is characterized by first wavelength $\lambda 1$ of 408 nm, first protective layer PL1 having a thickness t1 of 0.1 mm and numerical aperture NA1 of 0.85. The DVD is characterized by second wavelength $\lambda 2$ of 658 nm, the second protective layer PL2 having a thickness t2 of 0.6 mm, and the numerical aperture NA2 of 0.60. The CD is characterized by third wavelength $\lambda 3$ of 785 nm, the third protective layer PL3 having a thickness t3 of 1.2 mm, and the numerical aperture NA3 of 0.45.

The relationship of the recording densities ($\rho 1$, $\rho 2$ and $\rho 3$) among the first, second and third optical discs can be represented as $\rho 3 < \rho 2 < \rho 1$. When information is recorded and/or reproduced using each of the first, second and third optical discs, the magnifications (first magnification M1, second magnification M2 and third magnification M3) of objective optical system OBJ are expressed as M1=M2=M3=0. However, the combinations among the wavelength, thickness of the protective layer, numerical aperture, recording density and magnification are not restricted to this example.

Optical pickup apparatus PU3 comprises three-laser one-package 3L1P, objective optical system OBJ, aperture restricting device AP, biaxial actuator AC1, uniaxial actuator AC2, aperture STO corresponding to the numerical aperture NA1 of high-density optical disc HD, polarized beam splitter PBS, collimating lens COL (movable device), sense lens SL, beam shaping device SH, and quarter wave plate QWP. In this case, aforementioned three-laser one-package 3L1P (integrally) incorporates the following three sections in one and the same package:

first emitting section EP1 (first light source) for emitting a laser light flux having a wavelength of 408 nm (first light flux) at the time of recording/reproduction of information using high-density optical disc HD;

second emitting section EP2 (second light source) for emitting a laser light flux having a wavelength of 658 nm (second light flux) at the time of recording/reproduction of information using a DVD, and third emitting section EP3 (third light source) for emitting a laser light flux having a wavelength of 785 nm (third light flux) at the time of recording/reproduction of information using a CD. The aforementioned objective optical system OBJ comprises:

light detector PD, aberration correcting device L1 with a diffraction structure as a phase structure formed on the optical surface; and light converging device L2, having both spherical surfaces, for ensuring that the laser light flux passing through this aberration correcting device L1 is condensed on the information recording surfaces RL1, RL2 and RL3. Objective optical system OBJ used here is the same as the one used for first optical pickup apparatus PU1, and will not be described to avoid duplication. Further, in the three-laser one-package 3L1P, the first emitting section EP1 most crucial in the phase of optical designing is preferably arranged on the optical axis of the optical pickup apparatus PU3. It is also possible to arrange such a configuration that second emitting section EP2 or third emitting section EP3 on the optical axis of the optical pickup apparatus PU3. Alternatively, all-emitting sections can be arranged out of the axis. Still further, in the third embodiment (as well as the fourth embodiment to be described later), a light detector is provided separately. It can also be installed inside the three-laser one-package 3L1P or in its vicinity. This arrangement will eliminate the need of installing polarized beam splitter PBS and light detector PD.

In optical pickup apparatus PU3, when performing recording/reproduction of information using high-density optical disc HD, three-laser one-package 3L1P is actuated so that first emitting section EP1 will emit light. As the optical path is shown by a solid line in FIG. 8, the divergent light flux emitted from the first emitting section EP1 passes through beam shaping device SH, whereby the cross sectional profile is changed from an ellipse to a circle. The light flux passes through polarized beam splitter PBS and is formed into a parallel light flux through collimating lens COL. Then the light flux passes through quarter wave plate QWP, and the diameter of the light flux is adjusted by the aperture STO. The light flux passes through aperture restricting device AP, and is turned into a spot formed on information recording surface RL1, by objective optical system OBJ through first protective layer PL1. Objective optical system OBJ performs focusing and tracking by means of biaxial actuator AC1 arranged in the surrounding area. The reflected light flux modulated by the information pit on the information recording surface RL1 again passes through objective optical system OBJ, aperture restricting device AP and quarter wave plate QWP, and is turned into convergent light by collimating lens COL. After having been reflected by polarized beam splitter PBS, the light passes through sense lens SL. Then the light is received by light detector PD. The information recorded on high-density optical disc HD is read using the output signal of this light detector PD.

In optical pickup apparatus PU3, when recording/reproduction of information is performed using the DVD, collimating lens COL is moved by uniaxial actuator AC2 in such a way that the second light flux in the parallel state is emitted from collimating lens COL.

After that, three-laser one-package 3L1P is actuated to emit light from second emitting section EP2. It is also possible to make such arrangements that, after light has been emitted from second emitting section EP2, collimating lens COL is moved while the optimum position is searched.

As the optical path is shown by a dotted line in FIG. 8, the divergent light flux emitted from the second emitting section EP2 passes through beam shaping device SH, whereby the cross sectional profile is changed from an ellipse to a circle. The light flux passes through polarized beam splitter PBS and is formed into a parallel light flux through collimating lens COL. Then the diameter of the light flux is adjusted by the aperture STO. The light flux passes through quarter wave plate QWP and aperture restricting device AP, and is turned into a spot formed on information recording surface RL2, by objective optical system OBJ through first protective layer PL2. Objective optical system OBJ performs focusing and tracking by means of biaxial actuator AC1 arranged in the surrounding area. The reflected light flux modulated by the information pit on the information recording surface RL2 again passes through objective optical system OBJ, aperture restricting device AP and quarter wave plate QWP, and is turned into convergent light by collimating lens COL. After having been reflected by polarized beam splitter PBS, the light passes through sense lens SL. Then the light is received by light detector PD3 of hologram laser HL. The information recorded on a DVD is read using the output signal of light detector PD3.

In optical pickup apparatus PU3, when recording/reproduction of information is performed using the CD, collimating lens COL is moved by uniaxial actuator AC2 in such a way that the second light flux in the parallel state is emitted from collimating lens COL. After that, three-laser one-package 3L1P is actuated to emit light from third emitting section EP3. It is also possible to make such arrangements that, after light has been emitted from third emitting section EP3, collimating lens COL is moved while the optimum position is searched.

As the optical path is shown by a one-dot chain line in FIG. 8, the divergent light flux emitted from the third emitting section EP3 passes through sense lens SL and polarized beam splitter PBS. After having been formed into a parallel light flux through collimating lens COL, then the diameter of the light flux is adjusted by the aperture STO. The light flux passes through quarter wave plate QWP and aperture restricting device AP, and is turned into a spot formed on information recording surface RL3, by objective optical system OBJ through first protective layer PL3. Objective optical system OBJ performs focusing and tracking by means of biaxial actuator AC1 arranged in the surrounding area. The reflected light flux modulated by the information pit on the information recording surface RL3 again passes through objective optical system OBJ, aperture restricting device AP and quarter wave plate QWP, and is turned into convergent light by collimating lens COL. After having been reflected by polarized beam splitter PBS, the light passes through sense lens SL. Then the light is received by light detector PD. The information recorded on a CD is read using the output signal of light detector PD.

In the present embodiment, collimating lens COL is arranged inside the common optical path of the first through third light fluxes. The position of collimating lens COL can be adjusted in the direction of optical axis by uniaxial actuator AC2. As described above, chromatic aberration among first wavelength $\lambda 1$, second wavelength $\lambda 2$ and third wavelength $\lambda 3$ can be absorbed and the light flux of any wavelength, maintained in the parallel state, can be emitted from collimating lens COL. Further, if the position of collimating lens COL is changed in the direction of optical axis at the time of recording/reproduction of information using high-density optical disc HD, the spherical aberration of the spot formed on information recording surface RL1 of high-density optical disc HD can be corrected. This arrangement ensures satisfactory recording/reproduction characteristics at all times when high-density optical disc HD is used.

In the present embodiment, objective optical system OBJ comprises diffraction lens L1 as a plastic lens with a stepped diffraction structure HOE formed thereon, and light converging device L2 as a plastic lens, having aspherical surfaces-on both sides, with a NA of 0.85. The spherical aberration resulting from the difference in thickness among protective layers PL1, PL2 and PL3 is corrected by the operation of stepped diffraction structure HOE, whereby compatibility among high-density optical disc HD, DVD and CD is ensured.

A diffraction structure is formed the optical surface of collimating lens COL on the side of objective optical system OBJ. The depth of the level difference closest to the optical axis is 3.89 μm. This diffraction structure is used to correct the chromatic aberration of objective optical system OBJ. If the first light flux from first emitting section EP1 is applied to this diffraction structure, the fifth-order diffracted light is produced to provide the maximum diffraction efficiency. If the second light flux from second emitting section EP2 is applied to this diffraction structure, the third-order diffracted light is produced to provide the maximum diffraction efficiency. According to this arrangement, the diffraction efficiency is 100 percent for a wavelength of 408 nm in the case of the third order diffracted light, and 100 percent for a wavelength of 658 nm in the case of the second order diffracted light. Thus, high diffraction efficiency is obtained for any wavelength.

In this optical system, spherical aberration caused by a wide variety of factors can be corrected if a space between collimating lens COL and objective optical system OBJ can be adjusted during recording/reproduction of information using high-density optical disc HD.

This optical system uses three-laser one-package 3L1P wherein first emitting section E1, second emitting section EP2 and third emitting section EP3 are arranged close to one another. When the second and third light fluxes are launched into collimating lens COL, the second and third light fluxes emitted from collimating lens COL are not completely parallel with each other under the influence of chromatic aberration. Consequently, spherical aberration occurs to objective optical system OBJ. In this optical system, when recording/reproduction of information is performed using a DVD, collimating lens COL is moved by 0.640 mm—a distance corresponding to the chromatic aberration—to come close to objective optical system OBJ in such a way that the second light flux emitted from collimating lens COL is parallel. After that, recording/reproduction of information is performed using the DVD. When recording/reproduction of information is performed using a CD, collimating lens COL is moved by 0.800 mm—a distance corresponding to the chromatic aberration—to come close to objective optical system OBJ in such a way that the third light flux emitted from collimating lens COL is parallel. After that, recording/reproduction of information is performed using the CD is performed.

The causes for the spherical aberration to be corrected by adjustment of the position of collimating lens COL include variations of wavelengths caused by production errors of blue-violet semiconductor laser LD1, changes in refraction index of objective optical system OBJ resulting from temperature changes, distribution of refraction index, inter-layer focus jumps on multi-layer discs such as two- and four-layer discs at the time of recording/reproduction, variations in the thickness resulting from production errors of protective layer PL1, and thickness distribution.

The aforementioned description refers to the method for correcting the spherical aberration of the spot formed on information recording surface RL1 of high-density optical disc HD. It is also possible to arrange such a configuration that the spherical aberration of the spot formed on information recording surface RL2 of the DVD is corrected by adjusting the position of collimating lens COL.

Embodiment 4

FIG. 9 is a schematic view of a configuration of fourth optical pickup apparatus PU4 that provides appropriate recording/reproduction of information using any of high-density optical disc HD (first optical disc), DVD (second optical disc) and CD (third optical disc). In terms of optical specifications, high-density optical disc HD is characterized by first wavelength λ1 of 408 nm, first protective layer PL1 having a thickness t1 of 0.1 mm and numerical aperture NA1 of 0.85. The DVD is characterized by second wavelength λ2 of 658 nm, the second protective layer PL2 having a thickness t2 of 0.6 mm, and the numerical aperture NA2 of 0.60. The CD is characterized by third wavelength λ3 of 785 nm, the third protective layer PL3 having a thickness t3 of 1.2 mm, and the numerical aperture NA3 of 0.45.

The relationship of the recording densities (ρ1, ρ2 and ρ3) among the first, second and third optical discs can be represented as ρ3<ρ2<ρ1. When information is recorded and/or reproduced using each of the first, second and third optical discs, the magnifications (first magnification M1, second magnification M2 and third magnification M3) of objective optical system OBJ are expressed as M1=M2=M3=0. However, the combinations among the wavelength, thickness of the protective layer, numerical aperture, recording density and magnification are not restricted to this example.

Optical pickup apparatus PU4 comprises three-laser one-package 3L1P, objective optical system OBJ, aperture restricting device AP, biaxial actuator AC1, uniaxial actuator AC2, aperture STO corresponding to the numerical aperture NA1 of high-density optical disc HD, polarized beam splitter PBS, collimating lens COL (movable device), sense lens SL, beam shaping device SH, beam expander EXP and quarter wave plate QWP. In this case, aforementioned three-laser one-package 3L1P (integrally) incorporates the following three sections in one and the same package:

first emitting section EP1 (first light source) for emitting a laser light flux having a wavelength of 408 nm (first light flux) at the time of recording/reproduction of information using high-density optical disc HD;

second emitting section EP2. (second light source) for emitting a laser light flux having a wavelength of 658 nm (second light flux) at the time of recording/reproduction of information using a DVD, and third emitting section EP3 (third light source) for emitting a laser light flux having a wavelength of 785 nm (third light flux) at the time of recording/reproduction of information using a CD. The aforementioned objective optical system OBJ comprises:

light detector PD, aberration correcting device L1 with a diffraction structure as a phase structure formed on the optical surface; and light converging device L2, having both spherical surfaces, for ensuring that the laser light flux passing through this aberration correcting device L1 is condensed on the information recording surfaces RL1, RL2 and RL3. Objective optical system OBJ used here is the same as the one used for first optical pickup apparatus PU1, and will not be described to avoid duplication. Further, in the three-laser one-package 3L1P, the first emitting section EP1 most crucial in the phase of optical designing is preferably arranged on the optical axis of the optical pickup apparatus PU3. It is also possible to arrange such a configuration that second emitting section EP2 or third emitting section EP3 on the optical axis of the optical pickup apparatus PU3. Alternatively, all emitting sections can be arranged out of the axis.

In optical pickup apparatus PU4, when performing recording/reproduction of information using high-density optical disc HD, three-laser one-package 3L1P is actuated so that first emitting section EP1 will emit light. As the optical path is shown by a solid line in FIG. 9, the divergent light flux emitted from the first emitting section EP1 passes through beam shaping device SH, whereby the cross sectional profile is changed from an ellipse to a circle. The light flux passes through polarized beam splitter PBS and is formed into a parallel light flux through collimating lens COL. Then the light flux passes through beam expander EXP and quarter wave plate QWP, and the diameter of the light flux is adjusted by the aperture STO. The light flux passes through aperture restricting device AP, and is turned into a spot formed on information recording surface RL1, by objective optical system OBJ through first protective layer PL1. Objective optical system OBJ performs focusing and tracking by means of biaxial actuator AC1 arranged in the surrounding area. The reflected light flux modulated by the information pit on the information recording surface RL1 again passes through objective optical system OBJ, aperture restricting device AP, beam expander EXP and quarter wave plate QWP, and is turned into convergent light by collimating lens COL. After having been reflected by polarized beam splitter PBS, the light passes through sense lens SL. Then the light is received by light detector PD. The information recorded on high-density optical disc HD is read using the output signal of this light detector PD.

In optical pickup apparatus PU4, when recording/reproduction of information is performed, the second light flux in the parallel state is emitted from collimating lens COL, and lens L1 of beam expander EXP is moved by uniaxial actuator AC2. After that, three-laser one-package 3L1P is actuated to emit light from second emitting section EP2. It is also possible to make such arrangements that, after light has been emitted from second emitting section EP2, collimating lens COL is moved while the optimum position is searched.

As the optical path is shown by a dotted line in FIG. 9, the divergent light flux emitted from the second emitting section EP2 passes through beam shaping device SH, whereby the cross sectional profile is changed from an ellipse to a circle. The light flux passes through polarized beam splitter PBS and is formed into a parallel light flux through collimating lens COL. Then the light flux passes through beam expander EXP and quarter wave plate QWP, and the diameter of the light flux is adjusted by the aperture STO. The light flux passes through aperture restricting device AP, and is turned into a spot formed on information recording surface RL2, by objective optical system OBJ through second protective layer PL2. Objective optical system OBJ performs focusing and tracking by means of biaxial actuator AC1 arranged in the surrounding area. The reflected light flux modulated by the information pit on the information recording surface RL2 again passes through objective optical system OBJ, aperture restricting device AP, quarter wave plate QWP and beam expander EXP, and is turned into convergent light by collimating lens COL. After having been reflected by polarized beam splitter PBS, the light passes through sense lens SL. Then the light is received by light detector PD3 of hologram laser HL. The information recorded on the DVD is read using the output signal of light detector PD3.

In optical pickup apparatus PU4, when recording/reproduction of information is performed using the CD, the third light flux in the parallel state is emitted from collimating lens COL, and lens L1 of beam expander EXP is moved by uniaxial actuator AC2. After that, three-laser one-package 3L1P is actuated to emit light from third emitting section EP3. It is also possible to make such arrangements that, after light has been emitted from third emitting section EP3, collimating lens COL is moved while the optimum position is searched.

As the optical path is shown by a one-dot chain line in FIG. 9, the divergent light flux emitted from the third emitting section EP3 passes through sense lens SL and is reflected by polarized beam splitter PBS. After having been formed into a parallel light flux through collimating lens COL, the light flux passes through beam expander EXP and quarter wave plate QWP, and the diameter of the light flux is adjusted by the aperture STO. The light flux passes through aperture restricting device AP, and is turned into a spot formed on information recording surface RL3, by objective optical system OBJ through first protective layer PL3. Objective optical system OBJ performs focusing and tracking by means of biaxial actuator AC1 arranged in the surrounding area. The reflected light flux modulated by the information pit on the information recording surface RL3 again passes through objective optical system OBJ, aperture restricting device AP, quarter wave plate QWP and beam expander EXP, and is turned into convergent light by collimating lens COL. After having been reflected by polarized beam splitter PBS, the light passes through sense lens SL. Then the light is received by light detector PD3. The information recorded on a CD is read using the output signal of light detector PD3.

In the present embodiment, beam expander EXP as an aberration correcting device composed of concave lens L1 and convex lens L2 is arranged inside the common optical path of the first through third light fluxes. The position of concave lens L1 can be adjusted in the direction of optical axis by uniaxial actuator AC2. Thus, the parallel light fluxes, maintained in the parallel state, can be emitted from collimating lens COL. Further, if the position of the concave lens L1 is changed in the direction of optical axis at the time of recording/reproduction of information using high-density optical disc HD, the spherical aberration of the spot formed on information recording surface RL1 of high-density optical disc HD can be corrected. This arrangement ensures satisfactory recording/reproduction characteristics at all times when high-density optical disc HD is used.

The causes for the spherical aberration to be corrected by adjustment of the position of concave lens L1, collimating lens COL include variations of wavelengths caused by production errors of blue-violet semiconductor laser LD1, changes in refraction index of objective optical system OBJ resulting from temperature changes, distribution of refraction index, inter-layer focus jumps on multi-layer discs such as two- and four-layer discs at the time of recording/reproduction, variations in the thickness resulting from production errors of protective layer PL1, and thickness distribution.

The aforementioned description refers to the method for correcting the spherical aberration of the spot formed on information recording surface RL1 of high-density optical disc HD. It is also possible to arrange such a configuration that the spherical aberration of the spot formed on information recording surface RL2 of the DVD is corrected by adjusting the position of concave lens L1.

Working Example of Embodiment 1

The following describes the working example of the embodiment: The Working Example of Embodiment 1 shows a light converging system suited for use in the optical pickup apparatus shown in FIG. 5 or 8. Table 1 shows the lens data of the Working Example of Embodiment 1. In the following description (including the description of the lens data shown in the Table), the power multiplier of 10 (e.g. $2.5 \times 10^{-3}$) is expressed as E (e.g. 2.5E−3).

TABLE 1

[Diffraction collimator + duplex DOE objective lens]

f1 = 2.200, NA1 = 0.85, λ1 = 408 nm, m1 = 0.00, d0 = 18.653, d2 = 15.000, d6 = 0.719, d7 = 0.1
f2 = 2.278, NA2 = 0.65, λ2 = 658 nm, m2 = 0.00, d0 = 19.293, d2 = 14.360, d6 = 0.485, d7 = 0.6
f3 = 2.432, NA3 = 0.45, λ3 = 785 nm, m3 = 0.00, d0 = 19.453, d2 = 14.200, d6 = 0.321, d7 = 1.2

Paraxial value

| Surface number | r(mm) | d(mm) | Nλ1 | Nλ2 | Nλ3 | νd | Remarks |
|---|---|---|---|---|---|---|---|
| 0 | — | d0 | — | — | — | — | Emission point |
| 1 | −26.3010 | 1.5000 | 1.5242 | 1.5064 | 1.5050 | 56.5 | Collimating lens |
| 2 | −18.3440 | d2 | — | — | — | — | |
| 3 | ∞ | 1.0000 | 1.5242 | 1.5064 | 1.5050 | 56.5 | Objective lens |
| 4 | ∞ | 0.1000 | — | — | — | — | |
| 5 | 1.4492 | 2.6200 | 1.5596 | 1.5406 | 1.5372 | 56.3 | |
| 6 | −2.8750 | d6 | — | — | — | — | |
| 7 | ∞ | d7 | 1.6211 | 1.5798 | 1.5733 | 30.0 | Protective layer |
| 8 | ∞ | — | — | — | — | — | |

Aspherical coefficient

| | 1st surface | 2nd surface | 5th surface | 6th surface |
|---|---|---|---|---|
| κ | 0.76836E−03 | −0.52965E+01 | −0.65249E+00 | −0.43576E+02 |
| A4 | 0 | −0.16183E−03 | 0.77549E−02 | 0.97256E−01 |
| A6 | 0 | 0 | 0.29588E−03 | −0.10617E+00 |
| A8 | 0 | 0 | 0.19226E−02 | 0.81812E−01 |
| A10 | 0 | 0 | −0.12294E−02 | −0.41190E−01 |
| A12 | 0 | 0 | 0.29138E−03 | 0.11458E−01 |
| A14 | 0 | 0 | 0.21569E−03 | −0.13277E−02 |
| A16 | 0 | 0 | −0.16850E−03 | 0 |
| A18 | 0 | 0 | 0.44948E−04 | 0 |
| A20 | 0 | 0 | −0.43471E−05 | 0 |

TABLE 1-continued

[Diffraction collimator + duplex DOE objective lens]

Optical path difference functional coefficient

| | 2nd surface | 3rd surface | 4th surface |
|---|---|---|---|
| n1/n2/n3 | 10/6/5 | 0/1/0 | 0/0/1 |
| λB | 408 nm | 658 nm | 785 nm |
| B2 | −0.2000E−02 | 3.6500E−03 | 2.2200E−02 |
| B4 | −0.5914E−06 | −1.0196E−03 | −1.6575E−03 |
| B6 | 0 | 1.6630E−05 | 7.2714E−04 |
| B8 | 0 | −9.3691E−05 | −2.3193E−04 |
| B10 | 0 | 9.0441E−06 | 9.3608E−06 |

The optical surface of an objective optical system is formed on the aspherical surface axially symmetric about the optical axis, defined by the mathematical formula obtained by substituting the coefficient of Table 1 into the Mathematical Formula 1.

$$X(h) = \frac{(h^2/R)}{1 + \sqrt{1 - (1+\kappa)(h/R)^2}} + \sum_{i=0}^{9} A_{2i} h^{2i}$$ [Mathematical Formula 1]

In this formula, "X(h)" denotes the axis in the direction of optical axis (light traveling direction: positive), "κ" a cone coefficient, "$A_{2i}$" an aspherical surface coefficient, and "h" a height from the optical axis.

The length of the optical path assigned to the light flux of each wavelength from the diffraction structure is defined by the mathematical formula obtained by substituting the coefficient of Table 1 into the optical path difference function.

$$\phi(h) = \sum_{i=0}^{5} B_{2i} h^{2i}$$ [Mathematical Formula 2]

where "$B_{2i}$" denotes the coefficient of the optical path difference function.

Working Example of Embodiment 2

The Working Example of Embodiment 2 shows a light converging system suited for use in the optical pickup apparatus shown in FIG. 7 or 9. Table 2 shows the lens data of the Working Example of Embodiment 2.

TABLE 2

[Beam expander + duplex DOE objective lens]

f1 = 2.200, NA1 = 0.85, λ1 = 408 nm, m1 = 0.00, d2 = 2.500, d8 = 0.719, d9 = 0.1
f2 = 2.278, NA2 = 0.65, λ2 = 658 nm, m2 = 0.00, d2 = 2.620, d8 = 0.485, d9 = 0.6
f3 = 2.432, NA3 = 0.45, λ3 = 785 nm, m3 = 0.00, d2 = 2.650, d8 = 0.321, d9 = 1.2

Paraxial value

| Surface number | r(mm) | d(mm) | Nλ1 | Nλ2 | Nλ3 | νd | Remarks |
|---|---|---|---|---|---|---|---|
| 0 | — | ∞ | — | — | — | — | Emission point |
| 1 | −8.2691 | 1.0000 | 1.5242 | 1.5064 | 1.5050 | 56.5 | Beam expander |
| 2 | ∞ | d2 | — | — | — | — | |
| 3 | ∞ | 1.2000 | 1.5242 | 1.5064 | 1.5050 | 56.5 | |
| 4 | −10.3364 | 15.0000 | — | — | — | — | |
| 5 | ∞ | 1.0000 | 1.5242 | 1.5064 | 1.5050 | 56.5 | Objective lens |
| 6 | ∞ | 0.1000 | — | — | — | — | |
| 7 | 1.4492 | 2.6200 | 1.5596 | 1.5406 | 1.5372 | 56.3 | |
| 8 | −2.8750 | d8 | — | — | — | — | |
| 9 | ∞ | d9 | 1.6211 | 1.5798 | 1.5733 | 30.0 | Protective layer |
| 10 | ∞ | — | — | — | — | — | |

Aspherical coefficient

| | 1st surface | 4th surface | 7th surface | 8th surface |
|---|---|---|---|---|
| κ | −0.10021E−01 | −0.83939E+00 | −0.65249E+00 | −0.43576E+02 |
| A4 | −0.88085E−04 | −0.28383E−04 | 0.77549E−02 | 0.97256E−01 |
| A6 | 0 | 0 | 0.29588E−03 | −0.10617E+00 |
| A8 | 0 | 0 | 0.19226E−02 | 0.81812E−01 |
| A10 | 0 | 0 | −0.12294E−02 | −0.41190E−01 |
| A12 | 0 | 0 | 0.29138E−03 | 0.11458E−01 |
| A14 | 0 | 0 | 0.21569E−03 | −0.13277E−02 |
| A16 | 0 | 0 | −0.16850E−03 | 0 |
| A18 | 0 | 0 | 0.44948E−04 | 0 |
| A20 | 0 | 0 | −0.43471E−05 | 0 |

TABLE 2-continued

[Beam expander + duplex DOE objective lens]

Optical path difference functional coefficient

|  | 5th surface | 6th surface |
|---|---|---|
| n1/n2/n3 | 0/1/0 | 0/0/1 |
| λB | 658 nm | 785 nm |
| B2 | 3.6500E−03 | 2.2200E−02 |
| B4 | −1.0196E−03 | −1.6575E−03 |
| B6 | 1.6630E−05 | 7.2714E−04 |
| B8 | −9.3691E−05 | −2.3193E−04 |
| B10 | 9.0441E−06 | 9.3608E−06 |

Working Example of Embodiment 3

The Working Example of Embodiment 3 shows a light converging system suited for use in the optical pickup apparatus shown in FIG. 5 or 8. Diffraction structure HOE is formed on surface S1 of the objective optical system, and diffraction structure DOE is formed on surface S2 of the objective optical system. FIG. 10 is a longitudinal spherical aberration showing the light flux (HD) having wavelength $\lambda 1$ in Working Example of Embodiment 3, the light flux (DVD) having wavelength $\lambda 2$, and the light flux (CD) having wavelength $\lambda 3$. The vertical axis indicates the NA where the DVD aperture diameter is 1, and the horizontal axis shows the SA (mm). The dotted line denotes the aperture diameter required for each optical disc. This demonstrates appropriate correction of the aberration within the range of required numerical aperture.

TABLE 3

Working Example of Embodiment 1

| Collimating lens focal distance | $f_{1c} = 21.7$ mm | $f_{2c} = 22.36$ mm | $f_{3c} = 22.50$ mm |
|---|---|---|---|
| Objective lens focal distance | $f_1 = 3.10$ mm | $f_2 = 3.19$ mm | $f_3 = 3.23$ mm |
| Optical system magnification | −1/7.00 | 1/7.01 | −1/6.97 |
| Numerical aperture | NA1 = 0.65 | NA2 = 0.65 | NA3 = 0.50 |
| Magnification for image formation | m = 0.0 | m = 0.0 | m = 0.0 |

TABLE 3-2

| 1st surface | Curvature radius Ri | Space between surfaces di (407 nm) | Refraction index ni (407 nm) | di (658 nm) | ni (658 nm) | di (785 nm) | ni (785 nm) | Remarks | |
|---|---|---|---|---|---|---|---|---|---|
| 0 |  | 20.657 |  | 21.306 |  | 21.443 |  |  |  |
| 1 | 124.05295 | 1.75 | 1.52994 | 1.75 | 1.51427 | 1.75 | 1.51108 |  |  |
| 2 | −12.61278 | 5.635 | 1.0 | 4.986 | 1.0 | 4.849 | 1.0 | Aspherical surface | Collimating lens |
| 3 | ∞ | 0.00 | 1.0 | 0.00 | 1.0 | 0.00 | 1.0 | Aperture |  |
| 4 | ∞ | 0.80 | 1.55981 | 0.80 | 1.54062 | 0.80 | 1.53724 | Diffraction surface |  |
| 5 | ∞ | 0.10 | 1.0 | 0.10 | 1.0 | 0.10 | 1.0 |  |  |
| 6 | 1.93657 | 1.73 | 1.55981 | 1.73 | 1.54062 | 1.73 | 1.53724 | Aspherical surface/ diffraction surface |  |
| 7 | −11.34980 | 1.735 | 1.0 | 1.79694 | 1.0 | 1.45384 | 1.0 | Aspherical surface |  |
| 8 | ∞ | 0.6 | 1.61869 | 0.6 | 1.577315 | 1.2 | 1.57063 |  |  |
| 9 | ∞ |  |  |  |  |  |  |  |  |

* "di" indicates the displacement from the i–th surface to i + 1st surface.
* The beam shaping device is not contained.

Data of aspherical surface/diffraction surface
4th surface

| Optical path difference function coefficient | | * Stepped configuration |
|---|---|---|
| B2 | −1.6302E+00 | m1 = 5 |
| B4 | −1.3206E−01 | d1 = 2 |
| B6 | 6.7775E−02 | Only to $\lambda 2$ is assigned with phase difference to provide diffraction. |
| B8 | −8.4521E−03 | Since almost no phase difference occurs to $\lambda 1$ and $\lambda 3$, diffraction does not take place. |

TABLE 3-2-continued

| Aspherical surface coefficient | | Optical path difference function coefficient | | * Serrated form | |
|---|---|---|---|---|---|
| 6th surface | | | | | |
| κ | −1.2732E+00 | B2 | −4.8906E+00 | Order of | L = 3 |
| A4 | 1.0740E−02 | B4 | −3.9618E−01 | diffraction | M = N = 2 |
| A6 | 3.2020E−04 | B6 | 2.0333E−01 | | |
| A8 | 2.6844E−04 | B8 | −2.5356E−02 | | |
| A10 | −1.4918E−04 | | | | |
| A12 | 4.0856E−05 | | | | |
| A14 | −5.3878E−06 | | | | |
| 7th surface | | | | | |
| κ | −1.8439E+00 | | | | |
| A4 | 9.4757E−03 | | | | |
| A6 | 9.3834E−04 | | | | |
| A8 | −9.8769E−04 | | | | |
| A10 | 1.6945E−04 | | | | |
| A12 | −1.1458E−05 | | | | |

What is claimed is:

1. An optical pickup apparatus comprising:

a first light source for emitting a first light flux having first wavelength $\lambda 1$ (430 nm>$\lambda 1$>380 nm);

a second light source for emitting a second light flux having second wavelength $\lambda 2$ ($\lambda 2$>$\lambda 1$);

an objective optical system having a phase structure thereon, the objective optical system for converging the first light flux on a surface of a first recording medium having recording density $\rho 1$ for recording and/or reproducing information onto or from the first recording medium and for converging the second light flux on a surface of a second recording medium having recording density $\rho 2$ ($\rho 2$<$\rho 1$) for recording and/or reproducing information onto or from the second recording medium; and an optical system including a movable common optical element, the optical system guiding both the first light flux from the first light source and the second light flux from the second light source respectively to pass through the movable common optical element and to enter the objective optical system, wherein the movable common optical element is moved in a direction parallel to an optical axis to shape both the first light flux and the second light flux entering the objective optical system into an approximately parallel light flux respectively such that the objective optical system satisfies M1=M2=0, where:

M1 denotes a first magnification of the objective optical system for recording and/or reproducing the information on or from the first recording medium; and M2 denotes a second magnification of the objective optical system for recording and/or reproducing the information on or from the second recording medium, and wherein the first light source and the second light source are configured into a single body, wherein the optical system is configured in one of a first structure and a second structure such that:

in the first structure, the optical system further includes a collimator for shaping a light flux having a predetermined wavelength into a parallel light flux or an approximately parallel light flux, and the collimator is moved as the movable common optical element so as to correct a chromatic aberration of the collimator due to difference in wavelength between the first light flux and the second light flux and the collimator satisfies a following condition, $$0.01 < |\delta CL/fCL| < 0.05$$

where $\delta CL$ denotes a moving distance of the collimator lens; fCL denotes a focal length for the first wavelength $\lambda 1$, and in the second structure the optical system further includes a collimator for shaping a light flux having a predetermined wavelength into a parallel light flux or an approximately parallel light flux and an aberration correction device having two lenses, at least one of the two lenses is moved as the movable common optical element so as to correct a chromatic aberration of the collimator due to difference in wavelength between the first light flux and the second light flux, and that the aberration correction device satisfies a following condition, $$0.001 < |\delta BEML/fBEML| < 0.02$$

where, $\delta BEML$ denotes a moving distance of the movable common optical element in the aberration correction device and fBEML denotes a focal length of the movable common optical element in the aberration correction device for the first light flux having the first wavelength $\lambda 1$.

2. The optical pickup apparatus of claim 1, further comprising:

a third light source for emitting a third light flux having third wavelength $\lambda 3$ ($\lambda 3$>$\lambda 2$), wherein the optical system guides the third light flux from the third light source to pass through the movable common optical element and to enter the objective optical system, and the objective optical system further focuses the third light flux on a surface of a third recording medium having recording density $\rho 3$ ($\rho 3$<$\rho 2$) for recording and/or reproducing information onto or from the third recording medium, wherein the movable common optical element is moved in the direction parallel to the optical axis to shape the third light flux entering the objective optical system into an approximately parallel light flux such that the objective optical system satisfies M1=M2=M3=0, where:

M3 denotes a third magnification of the objective optical system for recording and/or reproducing the information on or from the third recording medium.

3. The optical pickup apparatus of claim 2,
wherein the first light source, the second light source and the third light source are configured into a single body.

4. The optical pickup apparatus of claim 2,
wherein the aberration correction device is provided on a light source side of the objective optical system and on an optical path of the first, second and third light fluxes.

5. The optical pickup apparatus of claim 1,
wherein the phase structure is a diffraction structure.

6. The optical pickup apparatus of claim 1,
wherein the aberration correction device performs spherical aberration correction.

7. The optical pickup apparatus of claim 1, further comprising:

a third light source for emitting a third light flux having third wavelength $\lambda 3$ ($\lambda 3 > \lambda 2$), wherein the optical system guides the third light flux from the third light source into the objective optical system, and the objective optical system further focuses the third light flux on a surface of a third recording medium having recording density $\rho 3$ ($\rho 3 < \rho 2$) for recording and/or reproducing information onto or from the third recording medium, and wherein the objective optical system satisfies $M3 \neq 0$, where:

M3 denotes a third magnification of the objective optical system for recording and/or reproducing the information on or from the third recording medium.

* * * * *